United States Patent [19]
Koike et al.

[11] Patent Number: 5,629,056
[45] Date of Patent: May 13, 1997

[54] LIQUID CRYSTAL DISPLAY PANEL AND PROCESS FOR PRODUCING THE SAME

[75] Inventors: Yoshio Koike; Tsuyoshi Kamada; Syun Tsuyuki; Noriaki Furukawa; Shigeru Masuda; Satoshi Murata; Tadashi Hasegawa; Takashi Sasabayashi; Seiji Tanuma; Takatoshi Mayama; Katsufumi Ohmuro; Minoru Ohtani, all of Kawasaki, Japan

[73] Assignee: Fujitsu Limited, Kawasaki, Japan

[21] Appl. No.: 667,365

[22] Filed: Jun. 21, 1996

Related U.S. Application Data

[63] Continuation of Ser. No. 358,753, Dec. 19, 1994, abandoned, which is a continuation-in-part of Ser. No. 115,129, Sep. 1, 1993, abandoned.

[30] Foreign Application Priority Data

| Sep. 1, 1992 | [JP] | Japan | 4-233689 |
| Sep. 2, 1992 | [JP] | Japan | 4-234798 |
| Dec. 4, 1992 | [JP] | Japan | 4-324559 |
| Aug. 27, 1993 | [JP] | Japan | 5-212722 |
| Mar. 8, 1994 | [JP] | Japan | 6-037079 |

[51] Int. Cl.$^6$ ............................................. G02F 1/1337
[52] U.S. Cl. ............................................. 428/1; 349/123
[58] Field of Search .................. 428/1, 473.5; 359/76, 359/75

[56] References Cited

U.S. PATENT DOCUMENTS 5,032,009 7/1991 Gibbons et al. .................. 350/341

FOREIGN PATENT DOCUMENTS

| 54-005754 | 1/1979 | Japan . |
| 62-267724 | 11/1987 | Japan . |
| 63-106624 | 5/1988 | Japan . |

OTHER PUBLICATIONS

Dubois et al., "Liquid-crystal orientation induced by polymeric surfaces", *Journal of Applied Physics*, vol. 47, No. 4, Apr. 1976, pp. 1270–1274.

*Primary Examiner*—Alexander Thomas
*Attorney, Agent, or Firm*—Staas & Halsey

[57] ABSTRACT

The liquid crystal display panel which has improved viewing angle characteristics, is free from deterioration of a liquid crystal, enables the alignment division to be easily and ensurely carried out and has a simple structure. The liquid crystal display panel is constructed so that substrates sandwiching a liquid crystal therebetween each have an alignment film at their inner walls, at least one of the alignment films comprises a layer of a particular polyimide film material capable of inducing a change in surface energy upon the action of light or heat energy, the alignment film comprises an assembly of two adjacent minute domains and has been continuously rubbed in one direction along the minute domains and the two minute domains are different from each other in pretilt angle (defined as an angle at which liquid crystalline molecules rise from the surface of the substrate).

13 Claims, 22 Drawing Sheets

$a > \beta > r$

Fig. 19(a)
UPPER SUBSTRATE
Fig. 19(b)
LOWER SUBSTRATE
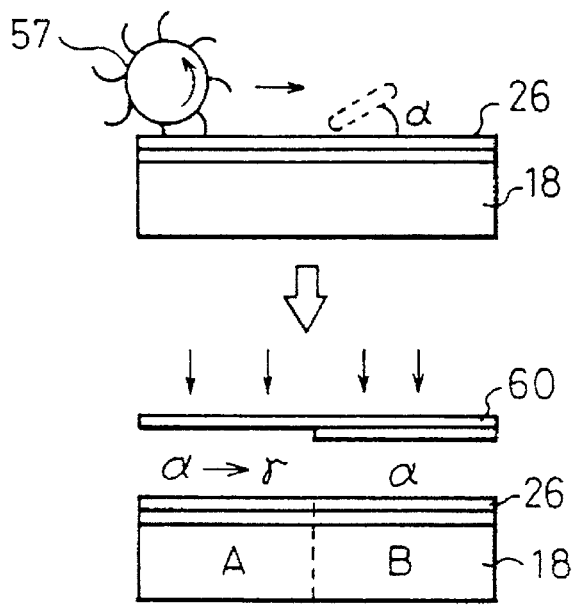
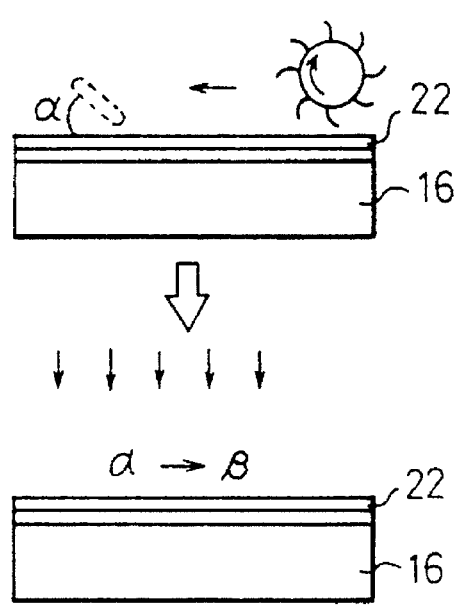
Fig. 20(a)
UPPER SUBSTRATE
Fig. 20(b)
LOWER SUBSTRATE
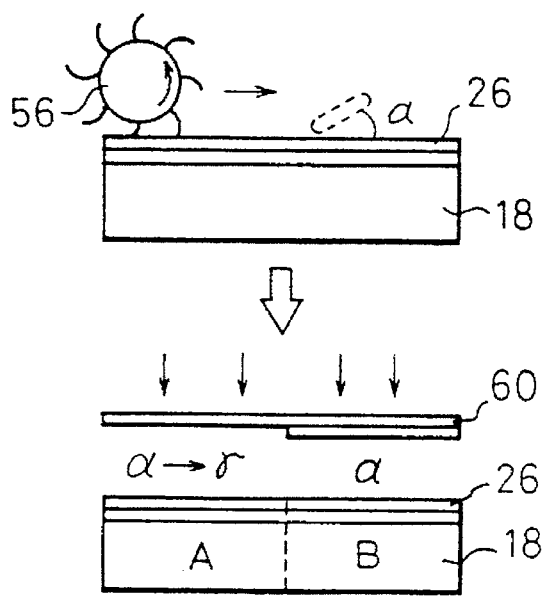
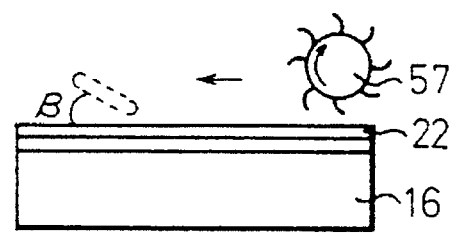

LIQUID CRYSTAL DISPLAY PANEL AND PROCESS FOR PRODUCING THE SAME

CROSS-REFERENCES TO RELATED APPLICATIONS

This application is a continuation, of application Ser. No. 08/358,753, filed Dec. 19, 1994, now abandoned, which is a continuation-in-part of U.S. patent application Ser. No. 08/115,129, filed Sep. 1, 1993, now abandoned.

BACKGROUND OF THE INVENTION

1. Field of the Invention

This invention relates to a liquid crystal display panel and a process for producing the same. More particularly, this invention relates to an alignment division type liquid crystal display panel, wherein different alignment regions are formed in a pixel region, and a process for producing the same. The term "alignment division type" used herein refers to such a construction that in order to provide high viewing angle characteristics, an alignment film provided on the inner wall of the substrate is divided into minute domains so that the minute domains are different from each other in alignment state of the liquid crystal.

2. Description of the Related Art

In recent years, there is an ever-increasing demand for an active matrix type color liquid crystal display panel. The increase in the demand has led to diversification of requirements for liquid crystal display panels per se. Among others, an improvement in viewing angle characteristics is strongly desired in the art. Specifically, in such liquid crystal panels, the contrast between light and dark of an image unfavorably varies depending upon the angle at which the observer views the image plane, so that the elimination of this problem (this phenomenon being generally recognized as viewing angle characteristics of liquid crystal panels) is desired in the art. For example, when a liquid crystal panel, which has been subjected to alignment treatment, is viewed obliquely from above the panel, the transmittance is remarkably lowered even by the application of a very low voltage and again increases with increasing the voltage. On the other hand, when the liquid crystal panel is viewed obliquely from below the panel, the transmittance does not decrease with increasing the voltage, so that the display becomes relatively bright even if a black display is contemplated.

A current technique which has attracted attention for providing high viewing angle characteristics is an alignment division technique where one pixel region is divided into different alignment domains. For example, Japanese Unexamined Patent Publication (Kokai) No. 63-106624 proposes that one pixel is divided into two domains different from each other in alignment direction of liquid crystalline molecules to combine viewing angle characteristics in the case of viewing obliquely from above the panel with the viewing angle characteristics in the case of viewing obliquely from below the panel, so that the overall viewing angle characteristics can be improved.

The alignment state of the conventional liquid crystal display panel of this type is shown in FIG. 1. In this drawing, the area of one pixel alone is shown for facilitating the understanding, and the one pixel is divided into two domains A and B different from each other in alignment state of liquid crystalline molecules. Light is incident upon one substrate (in this case, the substrate upon which light is incident being designated as "lower substrate") and passed through a liquid crystal sandwiched between the substrates and comes out through the other substrate (upper substrate). An observer is assumed to view the liquid crystal panel from above the upper substrate. The rubbing direction of the alignment film of the lower substrate is indicated by an arrow $R_L$, and the rubbing direction of the alignment film of the upper substrate is indicated by an arrow $R_U$.

In the domain A shown in FIG. 1, the rubbing direction $R_L$ of the alignment film of the lower substrate is 45° towards the left top, while the rubbing direction $R_U$ of the alignment film of the upper substrate is 45° towards the left bottom. In such an alignment treatment, viewing angle characteristics correspond to the case where the liquid crystal panel is viewed obliquely from above the panel. In this case, the application of a slight voltage results in a markedly lowered transmittance, and the transmittance again increases with increasing the voltage. The viewing angle characteristics are indicated by a double arrow in the drawing. On the other hand, in the domain B, the rubbing direction $R_L$ of the alignment film of the lower substrate is 45° towards the right bottom, while the rubbing direction $R_U$ of the alignment film of the upper substrate is 45° towards the right top. In such an alignment treatment, the viewing angle characteristics are opposite to those in the domain A. When minute domain A and minute domain B different from each other in alignment treatment are provided adjacently to each other, the viewing angle characteristics become such that the sum of the high-transmittance viewing angle characteristics and the low-transmittance viewing angle characteristics is divided by 2. In this case, in both cases where the liquid crystal panel is viewed from above the panel and below the panel, the resultant viewing angle characteristics become close to the viewing angle characteristics in the case where the liquid crystal panel is viewed from the front on the whole.

FIG. 2 is a cross-sectional view of a liquid crystal panel 1 having minute region A and minute region B. As shown in the drawing, the liquid crystal panel 1 comprises a TFT substrate 16 as a lower substrate, a CF substrate 18 as an upper substrate and a liquid crystal 20 sandwiched between these substrates. The lower substrate 16 is provided with a transparent pixel electrode 5 and an alignment film 6, and the upper substrate 18 is provided with a transparent common electrode 7 and an alignment film 8. In FIG. 1, the liquid crystal molecule in minute domain A is indicated as rising obliquely towards the left top, while the liquid crystal molecule in minute domain B is indicated as rising obliquely towards the right top. The above-described viewing angle characteristics occur based on the direction of tilt of the liquid crystalline molecule.

In FIG. 2, the alignment films 6 and 8 each comprise a two-layer structure comprising a lower alignment material layer 9,4 and an upper alignment material layer 2,3. The upper alignment material layer 2,3 are patterned by lithography so as to form minute portions respectively corresponding to minute domains A and B, and the lower alignment material layers 9,4 are exposed from opening portions adjacent to the respective minute portions. The upper alignment material layers 2,3 comprising minute portions are alternately provided on the side of the upper substrate 18 and on the side of the lower substrate 16. Specifically, in minute domain A, the upper alignment material layer 2 on the side of the lower substrate 16 faces the lower alignment material layer 4 on the side of the upper substrate 18, while in minute domain B, the upper alignment material layer 3 on the side of the upper substrate 18 faces the lower alignment material layer 9 on the side of the lower substrate 16. In this case, in order to provide a liquid crystal panel 1 having minute domains A and B different from each other in alignment state of the liquid crystal, the alignment films 6 and 8 of the respective substrates should be rubbed for each of minute domains A and B. In rubbing, a mask is used for selective rubbing. In minute domain A, the upper alignment material layer 2 on the side of the lower substrate 16 is rubbed in a direction indicated by an arrow $R_L$ of domain A in FIG. 1, while the lower alignment material layer 4 on the side of the upper substrate 18 is rubbed in a direction indicated by an arrow $R_U$ of domain A in FIG. 1. This is true of minute domain B.

The liquid crystal display panel 1 is produced according to steps shown in the flow sheet of FIG. 3. After a substrate is introduced, a lower alignment material and an upper alignment material are successively coated on the inner wall of the substrate to form alignment films. Subsequently, a suitable resist material is coated for patterning the upper alignment material layer. After the formation of the resist film, a series of steps comprising selective exposure, development-etching and removal of the resist are carried out. After the formation of alignment films each patterned to a desired form, the alignment films are rubbed, a spacer is provided by spreading, a liquid crystal is introduced, and a polarizing plate is laminated, thereby completing an LC panel.

The construction, behavior and the like of the conventional active matrix type color liquid crystal display panel could be easily understood from the above description with reference to FIGS. 1 and 2. Further, in the case of the active matrix drive, a gate bus line C and a drain bus line (not shown) are provided on the lower substrate 16 having a pixel electrode 5. In the interface of minute domains A and B different from each other in alignment state, liquid crystalline molecules tilted in directions opposite to each other come into contact with each other, so that the alignment of the liquid crystal is distorted and the disclination occurs. This is likely to cause light to be leaked along the borderline. For this reason, the gate bus line C is designed to be positioned on the boundary between minute regions A and B so that the gate bus line C can shield light leaked due to the disclination, thereby obtaining a good display.

However, in the conventional construction as shown in FIG. 2 wherein the gate bus line C is designed to be positioned in the interface of minute domains A and B, the upper alignment material layer 2 at its end 2a on the side of the lower substrate 16 and the upper alignment material layer 3 at its end 3a on the side of the upper substrate 18 are formed at a position which overlaps with the gate bus line C. This causes the liquid crystal 20 to be electrolyxed to generate an ion, which is likely to deteriorate the liquid crystal 20 and, hence, often lowers the performance of the liquid crystal panel 1.

One of the reasons why the liquid crystal 20 is electrolyzed is that the liquid crystal 20 is in contact with the upper alignment material layer 2 and the lower alignment material layer 4 different from each other in material. The electrolysis occurs based on the same principle as the electrolysis in the case where two electrode pieces different from each other in material are introduced into a solution. Another reason is that the liquid crystal 20 receives direct current during driving. The gate bus line C comprises many gate lines, for example, 400 lines, which are successively scanned. Each gate line C has a plus value for 1/400th of the scan time and a constant minus value for 399/400th of the scan time. Therefore, it can be said that direct voltage is always applied to the liquid crystal 20 between the gate bus line C and the common electrode 7. In FIG. 2, a potential difference $v_1$ occurs between the upper alignment material layer 3 and the lower alignment material layer 2 which face each other above the gate bus line C, and on the side of the lower substrate 16, a potential difference v2 occurs between the upper alignment material layer 3 and the lower alignment material layer 2. In particular, the presence of a leak defect in a gate insulating film results in an increased direct voltage applied to the liquid crystalline layer and the alignment film. Further, when two gate bus lines C are arranged parallel to each other, the potential of the space between the two gate bus lines C becomes the same as that of the gate bus line C.

SUMMARY OF THE INVENTION

The first object of the present invention is to provide a liquid crystal display panel which can realize improved viewing angle characteristics and prevent a deterioration in liquid crystal attributable to the generation of ions and has a simple structure.

As described above with reference to FIG. 3, the conventional active matrix type color liquid crystal display panel is produced through a series of photolithographic steps. The alignment film is formed by coating the first (lower) alignment material layer, coating the second (upper) alignment material layer and conducting patterning by photolithography. In this method, however, the time taken for division of alignment domains is so long that the cost is very high in respect of members and equipment. Further, the step of photolithographic patterning involves a wet process, which leads to a fear of the alignment film being attacked by a developing solution or resist releasing solution. The damage to the alignment film results in a lowered pretilt angle and is also causative of a failure of alignment.

In addition, the rubbing treatment too has problems. In a pixel division type liquid crystal display panel, rubbing should be carried out in an opposite direction for each two minute domains. In this case, as described above, the rubbing treatment should be carried out twice by photolithography. The first rubbing treatment process comprises coating an alignment film on the inner surface of the substrate, coating a resist on the alignment film, providing in the resist an opening corresponding to one of the minute domains, conducting rubbing in a given direction and removing the resist. On the other hand, the second rubbing treatment process comprises coating a resist on the alignment film, which has been subjected to the first rubbing treatment, providing in the resist an opening corresponding to the other domain, conducting rubbing in the opposite direction and removing the resist.

In the above rubbing method, two photolithographic treatments and two rubbing treatments are necessary for the alignment film of each substrate. Therefore, for both the substrates, four (in total) photolithographic treatments and four (in total) rubbing treatments are necessary.

Since the photolithographic treatment and rubbing treatment are repeated many times, the production cost is increased and, further, there arises a problem that the surface of the alignment film becomes so rough that the alignment of the liquid crystal is not stable.

Accordingly, the second object of the present invention is to provide an improved process for producing the above-described improved liquid crystal display panel using a simple and short-time dry process.

The first object of the present invention can be attained by a liquid crystal display panel comprising a pair of substrates and a liquid crystalline substance sandwiched between said substrate, characterize in that said substrates respectively at their inner walls are provided with an alignment film, at least one of said alignment films comprising a layer of a member selected from the group consisting of the following polyimide film materials:

1. a polyimide which does not have in its molecule an ether bond but has at least one moiety selected from the group consisting of a peroxide, a ketone, an ester, an amine, an amide and derivatives of said moieties and, upon the action of light or heat energy, can induce a change in surface energy, for example, as a result of a reaction of said moiety with water, oxygen and/or hydrogen;
2. a polyimide which has in its molecule a carbon-carbon double bond or a carbon-carbon triple bond and, upon the action of light or heat energy, can induce a change in surface energy, for example, as a result of an intramolecular or intermolecular reaction;
3. a polyimide which has in its molecule a carbon-carbon double bond or a carbon-carbon triple bond and, upon the action of light or heat energy, can induce a change in surface energy, for example, as a result of a reaction of said bond with water or hydrogen in air;
4. a polyimide which has in its molecule a carbon-carbon double bond or a carbon-carbon triple bond and, upon the action of light or heat energy in the presence of a halogen, can induce a change in surface energy, for example, as a result of a reaction of said bond with the halogen;

said alignment film comprising an aggregate of two adjacent minute domains and having been continuously rubbed in one direction along said minute domains, said two minute domains being different from each other in pretilt angle (defined as an angle at which liquid crystalline molecules rise from the surface of the substrate).

The second object of the present invention can be attained by a process for producing the above-described liquid crystal display panel, characterized by comprising the steps of: applying to a film material for forming said single alignment film to a substrate; applying to the resultant coating a light or heat energy in a pattern corresponding to a distribution pattern of said aggregate of minute domains; and subsequently rubbing the film.

BRIEF DESCRIPTION OF THE DRAWINGS

The above and other objects, features and advantages of the invention will become more apparent from the following description when considered in conjunction with the accompanying drawings, in which:

FIG. 19 is a cross-sectional view showing an embodiment for the production of upper and lower substrates by UV irradiation;

FIG. 20 is a cross-sectional view showing another embodiment of the production of upper and lower substrates by UV irradiation;

DESCRIPTION OF THE PREFERRED EMBODIMENTS

Figure 1:
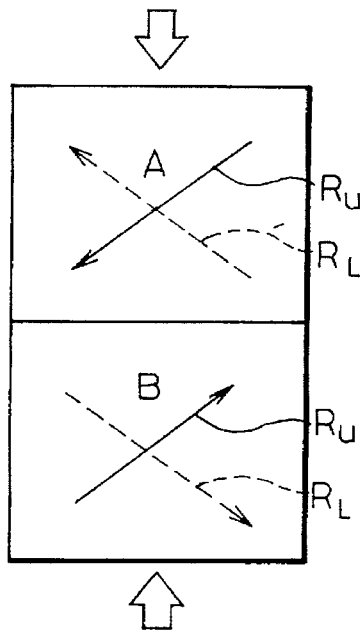
FIG. 1 is a schematic view showing an alignment treatment of the conventional liquid crystal display panel.
Figure 2:
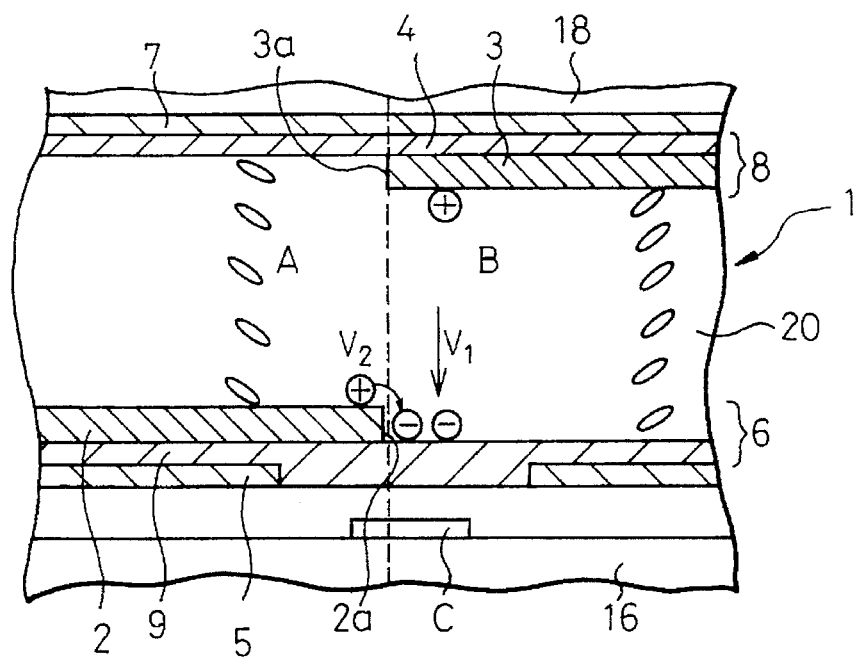
FIG. 2 is a cross-sectional view showing a construction of the conventional liquid crystal display panel.

The polyimide film materials used as an alignment film material in the liquid crystal display panel according to the present invention are the above polyimides 1 to 4 which can induce a change in surface energy upon the action of light or heat energy. The light or heat energy applicable herein may be those emitted from various light source and heat sources depending upon properties of the polyimide used, for example, a particular functional group contained in the polyimide molecule. Examples of the light energy include ultraviolet rays from a high pressure or low pressure mercury lamp, and examples of the heat energy include heat from an infrared heater and heat from a laser.

The light or heat energy can be applied under various conditions. For example, when the polyimide used is the above polyimide 1 or 3, it is preferred to expose the polyimide to air having a humidity of 20% or more during or immediately after the application of light or heat energy. On the other hand, when the polyimide used is the above polyimide 4, the light or heat energy is preferably applied, for example, in an atmosphere of a halogen such as bromine.

As described above, the mechanism through which the polyimide of the alignment film gives rise to a change in surface energy upon the application of light or heat energy depends upon a particular functional group contained in the polyimide molecule. Specifically, as is apparent from the following typical example, the surface energy is changed as a result of the following change in the long chain of the polyimide in the presence of light or heat.

Reaction formula 1:

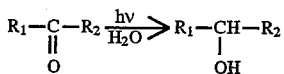

Reaction formula 2:

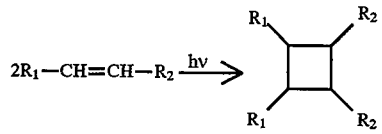

Reaction formula 3:

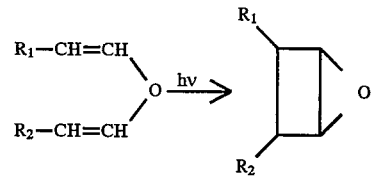

Reaction formula 4:

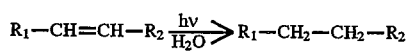

Reaction formula 5:

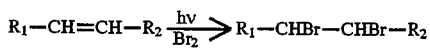

In the above reaction formulae, $R_1$ and $R_2$ each represent a given group located at the end of the polyimide, and examples of the group include the following groups.

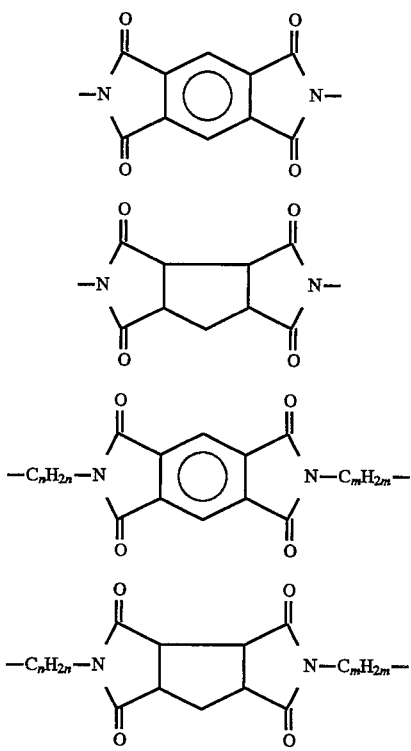

wherein m and n are each an integer.

The presence of an imide group or an amic acid group suffices for $R_1$ and $R_2$.

The polyimide used in the present invention is not particularly limited so far as it participates in the above reaction. In the selection of the polyimide, factors such as structure, performance and production process of the liquid crystal display device should be taken into consideration. Examples of polyimides suitably used in the present invention are as follows.

$$\left( \begin{array}{c} \overset{\diagdown}{\phantom{N}}N-R_3-N\overset{\diagup}{\phantom{N}} \underset{\diagup}{\overset{\diagdown}{\phantom{C}}} \overset{O}{\underset{O}{\overset{\parallel}{C}}} \phantom{xx} \overset{O}{\underset{O}{\overset{\parallel}{C}}} \underset{\diagdown}{\overset{\diagup}{\phantom{C}}} R_4 \underset{\diagup}{\overset{\diagdown}{\phantom{C}}} \overset{O}{\underset{O}{\overset{\parallel}{C}}} \phantom{xx} \overset{O}{\underset{O}{\overset{\parallel}{C}}} \underset{\diagdown}{\overset{\diagup}{\phantom{C}}} \end{array} \right)_n$$

In the above formula, $R_3$ and $R_4$ FRay have structures given in the following Table 1, and n is an integer of several tens to several tens of thousand.

TABLE 1

| Examples of $R_3$ and $R_4$ in polyimide | |
|---|---|
| $R_3$ | $R_4$ |
| $-C_nH_{2n}-\underset{\underset{O}{\parallel}}{C}-C_mH_{2m}-$ | 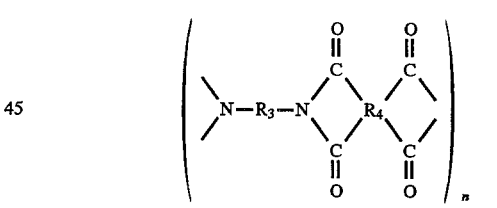 |
| $-C_nH_{2n}-CH=CH-C_mH_{2m}-$ | |

TABLE 1-continued

Examples of $R_3$ and $R_4$ in polyimide

| $R_3$ | $R_4$ |
|---|---|
| $-C_nH_{2n}-NH-C_mH_{2m}-$ wherein m and n are an integer. | (cyclopentane and cyclohexane structures) |

Further, in the present invention, the alignment film material may comprise, instead of the polyimide, a polyamic acid which is a precursor of the polyimide. Specifically, the polyamic acid is synthesized by reacting a diamine compound with an acid anhydride in a suitable solvent, and the cyelodehydration thereof through the application of light or heat energy provides a polylmide. An example of this case is as follows.

Reaction formula 6:

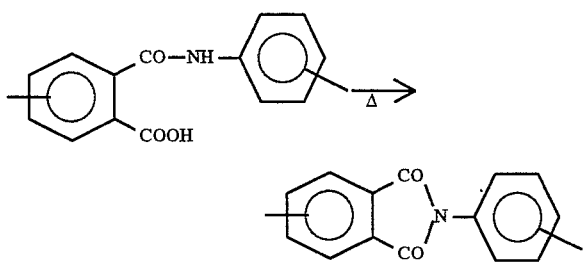

As described above, a single alignment film including in the liquid crystal display panel of the present invention comprises an assembly of two minute domains adjacent to each other and having been continuously rubbed in one direction along the minute domains, and the two minute domains are different from each other in pretilt angle. In this case, in order for the pretilt angle of the liquid crystal in contact with the alignment film in one minute domain to be rendered different from that of the liquid crystal in contact with the alignment film in the other minute domain, it is recommended that a treatment different from rubbing be carried out. Examples of the treatment different from rubbing include selective irradiation, for example, with ultraviolet rays, selective heating using a heat source, such as an infrared heater or a laser, and selective precuring of minute domains after coating of an alignment film material and before rubbing in such a manner that the solvent evaporation time is varied. Other examples of the treatment usable in the present invention include a treatment wherein the surface geometry (surface area) of the minute domains is selectively changed, for example, the unevenness on the surface of one domain is increased, a treatment wherein the concentration distribution of chemical component(s) governing the pretilt angle of the surface of the minute domain is selectively changed, for example, the surface portion of one minute domain is intentionally cut out and removed, a treatment wherein the relationship between the substrate and the alignment film in respect of hydrophobicity is selectively varied and a treatment wherein a material layer, which can increase or decrease the pretilt angle, is selectively deposited on the surface of the minute domains.

In practicing the present invention, all the structure of the liquid crystal display panel, the members (including a liquid crystalline substance sandwiched between the substrates) used in the liquid crystal display panel and the production process may be based on those of the prior art typical examples of which will be given in the following description.

The present invention will now be described in more detail in the following embodiments with reference to the accompanying drawings. Before the embodiments, the liquid crystal display panel of the present invention will be briefly described.

As shown in the cross-sectional view of FIG. 4, the liquid crystal display panel of the present invention comprises a first substrate 18 having an alignment film 26, a second substrate 16 facing the first substrate and having an alignment film 22 and a liquid crystal 20 inserted between the first substrate and the second substrate, at least the alignment film 22 of the first substrate comprising a single alignment film (hereinafter referred to also as "alignment material layer") having first and second minute domains A and B adjacent to each other. The single alignment film has been continuously rubbed in one direction along the first and second minute domains A and B. Further, a treatment, preferably different from rubbing, has been carried out so that the pretilt angles $\alpha$ and $\gamma$ of the liquid crystal in contact with the alignment film in the first and second minute domains A and B are different from each other.

In the process for producing the above liquid crystal display panel, as described above, treatments different from rubbing so as for the pretilt angles $\alpha$ and $\gamma$ of the liquid crystal in contact with the first and second minute domains A and B to be different from each other include selective irradiation of the first and second domains A and B with light (for example, ultraviolet rays), selective change in concentration distribution of chemical components governing the pretilt angle of the surface of the first and second domains A and B and selective heating of the first and second domains A and B.

In the above construction, the alignment film 26 of the first substrate has first and second adjacent minute domains A and B, which have the same alignment direction of the liquid crystal, are different from each other in pretilt angles $\alpha$ and $\gamma$. Regarding the second substrate, the alignment film 22 of the second substrate, for example, the first and second adjacent minute domains A and B are substantially identical to each other in alignment direction and pretilt angle $\beta$. In this case, the relationship $\alpha > \beta > \gamma$ is satisfied. In the above construction, both the alignment films of the first and second substrates have a single layer structure and simpler structure than those of the prior art. The second substrate too may be constructed so as to have first and second adjacent minute domains B and A which are identical to each other in alignment direction of the liquid crystal and different from each other in pretilt angles $\alpha$ and $\gamma$.

When the relationship $\alpha > \beta > \gamma$ is satisfied, in the first domain A, the pretilt angle of the liquid crystal in contact with the first substrate is $\alpha$ with the pretilt angle of the liquid crystal in contact with the second substrate being $\beta$. In the second domain B, the pretilt angle of the liquid crystal in contact with the first substrate is $\gamma$ with the pretilt angle of the liquid crystal in contact with the second substrate being $\beta$. The Liquid crystalline molecule located intermediate between the first substrate and the second substrate rise according to a higher pretilt angle in the first substrate and the second substrate upon the application of a voltage. Specifically, in the first domain A, the liquid crystalline molecule rises (tilts) in the same direction as the liquid crystal in contact with the first substrate, while in the second domain B, the liquid crystalline molecule rises (tilts) in the same direction as the liquid crystal in contact with the second substrate. Thus, pixel division can be achieved.

Figure 3:
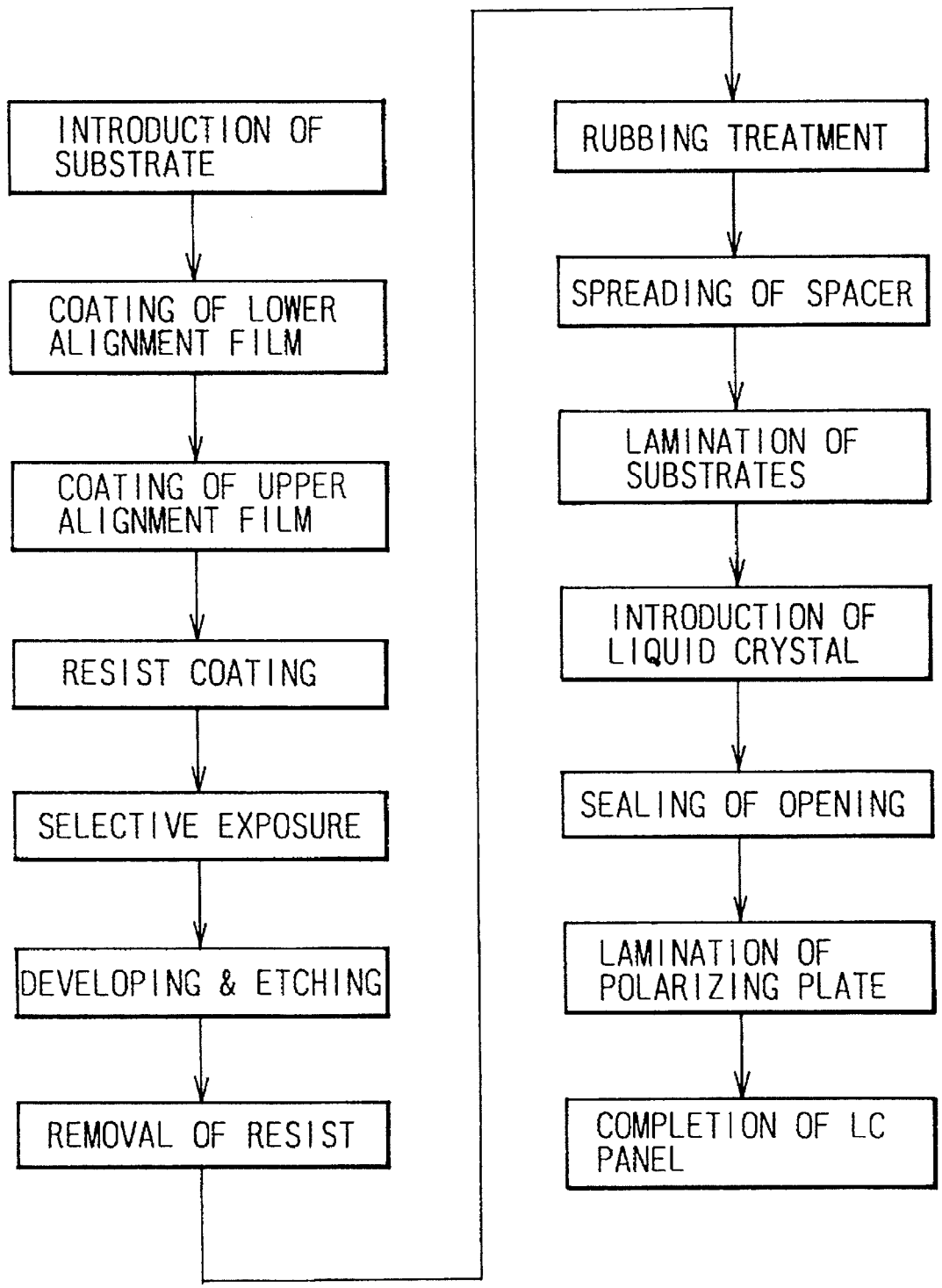
FIG. 3 is a flow sheet showing a production process for the conventional liquid crystal display panel.
Figure 4:
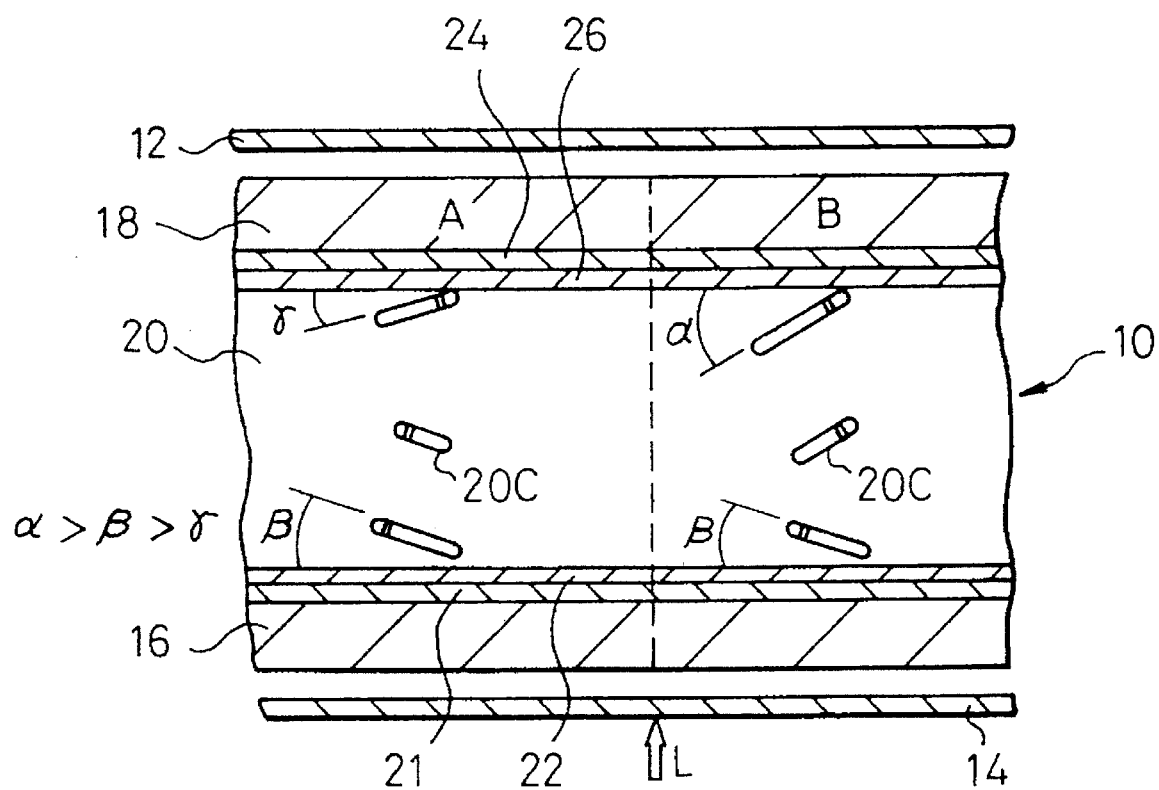
FIG. 4 is a cross-sectional view showing a construction of the liquid crystal display panel of the present invention.
Figure 5:
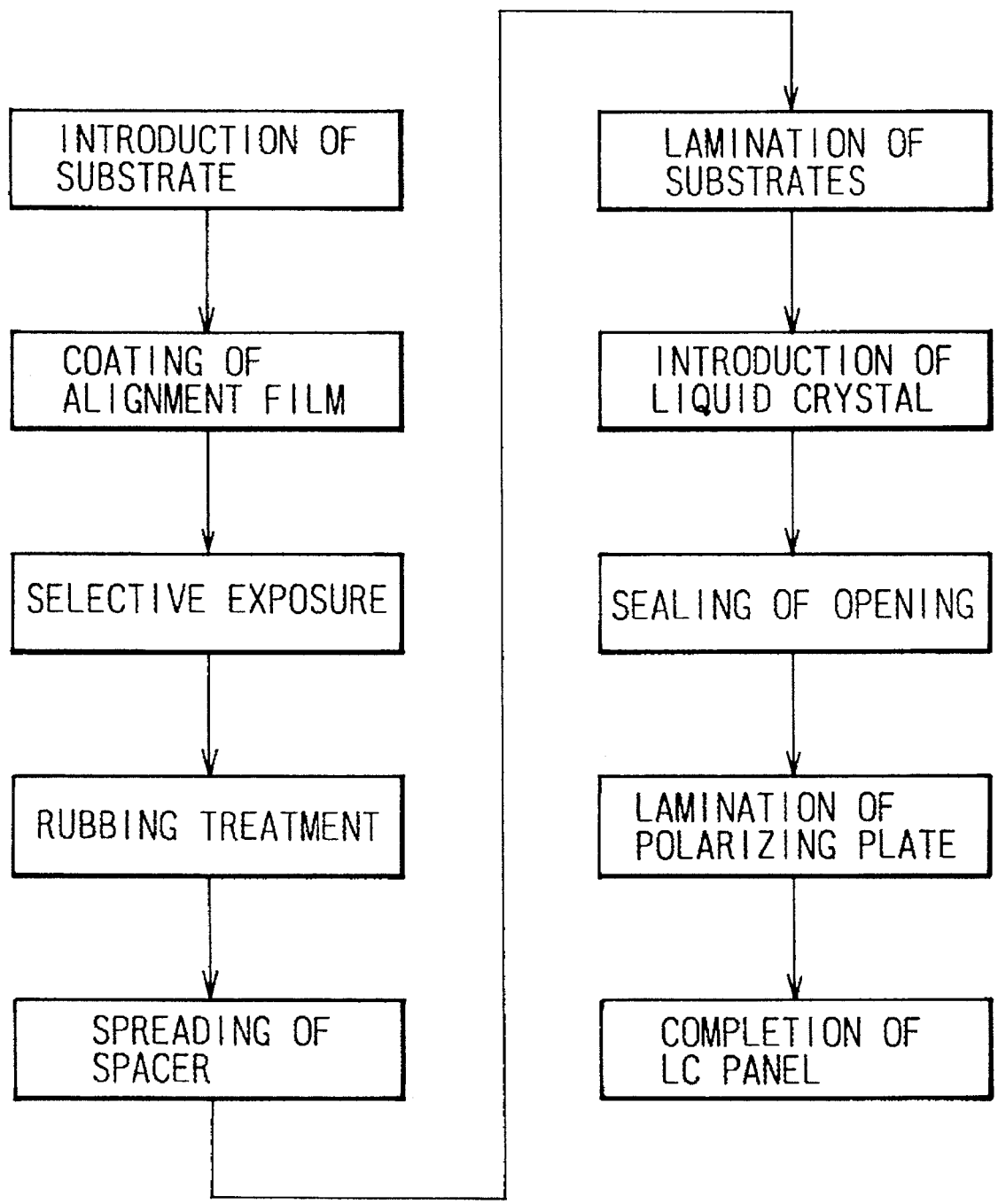
FIG. 5 is a flow sheet showing a production process for the liquid crystal display panel of the present invention.

The liquid crystal display panel shown in FIG. 4 can be produced through a series of steps as shown in a flow sheet of FIG. 5. Specifically, After the introduction of a substrate, an alignment film material is coated onto the substrate, and the resultant alignment film is subjected to selective exposure or selective heating to form minute domains A and B different from each other in pretilt angle. For example, when ultraviolet rays from a high pressure mercury lamp are used, the selective exposure is carried out with a photomask being interposed between the mercury lamp and the alignment film. As a result of the selective exposure, a lower pretilt angle β is provided in an exposed area (second domain B), while a higher pretilt angle α is provided in a nonexposed area (first domain A). After the formation of desired minute domains in the alignment film, a rubbing treatment is carried out, a spacer is provided by coating, a substrate is laminated, a liquid crystal is introduced, the opening for introducing a liquid crystal is sealed, and a polarizing plate is laminated to complete a panel. As can be easily understood, this production process is significantly shortened and simplified as compared with the conventional process described above with reference to FIG. 3. It is particularly noteworthy that the photographic process and the wet process required of the conventional process are unnecessary, which contributes to significant process time shortening and cost reduction.

The present invention has aimed at the molecular structure of a polyimide used as an alignment film material with a view to eliminating the problems of the alignment division process, and the use of a polyimide having a particular functional group in its molecule has enabled the alignment region to be divided by the application of light or heat energy. In particular, the division of the alignment region can be more easily and surely carried out by taking into consideration the introduction of a particular functional group in the stage of design of the polyimide molecule. Further, according to the present invention, an alignment division liquid crystal display panel can be stably provided at a low cost in a high yield without a fear of the alignment film being damaged.

An embodiment will now be described with reference to FIG. 4 again. FIG. 4 shows a liquid crystal display panel 10 for a liquid crystal display according to the first embodiment of the present invention. Polarizers 12 and 14 are arranged on both sides of the liquid crystal panel 10 perpendicular to each other in the normally white mode, or parallel to each other in the normally black mode.

The liquid crystal panel 10 comprises a pair of transparent glass plates 16 and 18 and a liquid crystal 20 inserted between the glass plates 16 and 18. In this embodiment, a light from a source (not shown) is incident upon the liquid crystal panel 10 as shown by the arrow L, and an observer views the liquid crystal panel 10 from the side opposite to the incident light. In the description below, the substrate 16 on the light incident side will be called a "lower substrate," and the substrate 18 on the observer side will be called an "upper substrate." It is, of course, possible to reverse the light incident side and the observer side.

Figure 6:
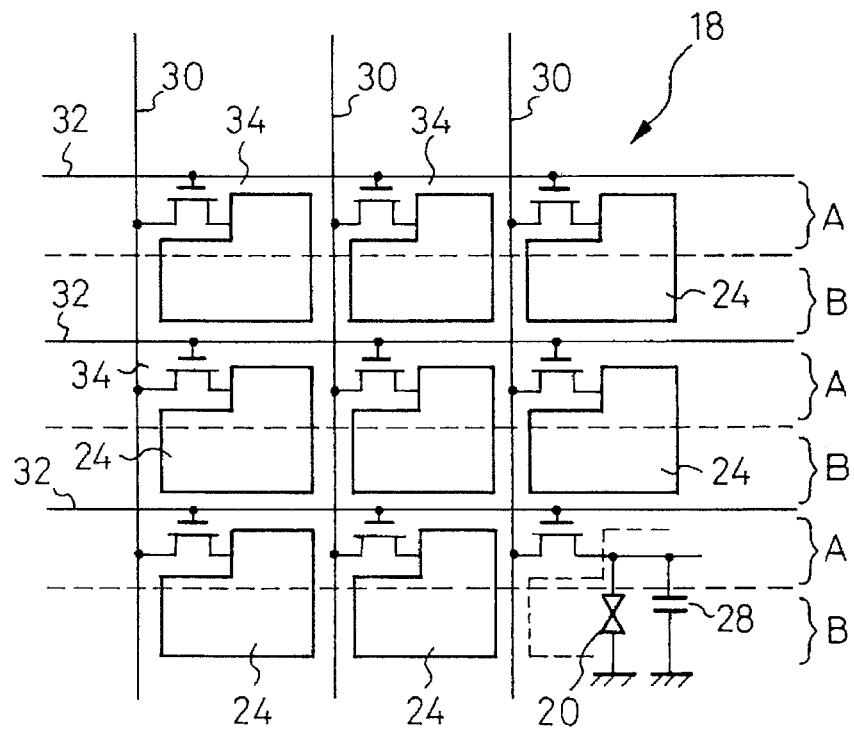
FIG. 6 is a schematic view of the layout of pixel electrodes.

A common electrode 21 made of ITO and an alignment film 22 are arranged on the inner surface of the lower substrate 16, and an element (pixel) electrode 24 and an alignment film 26 are arranged on the inner surface of the upper substrate 18. A color filter layer (not shown) is provided under the common electrode 21 of the lower substrate 16. It is also possible to reverse the common electrode 21 and the element electrode As shown in FIG. 6, the element electrode 24 of the upper substrate 18 is connected to an active matrix circuit. The active matrix circuit comprises data bus lines 30 and gate bus lines 32 extending vertically and horizontally in a matrix, and the element electrode 24 is connected to data bus lines 30 and gate bus lines 32 through thin-film transistors (TFTs) 34.

As shown in FIG. 6, each pixel region represented by element electrode 24 is divided into two minute domains A and B. The division pattern shown in FIG. 6 is in a stripe form formed by a line passing through the center of a row of element electrodes 24. Further, it is also possible to form two minute domains A and B in a zigzag pattern on a row of the element electrodes 24.

In the embodiment shown in the drawing, the liquid crystal 20 is a twisted-nematic (TN) liquid crystal. A basic feature of the rubbing treatment and the alignment division established thereby will be described with reference to FIGS. 7 through 13.

Figure 7:
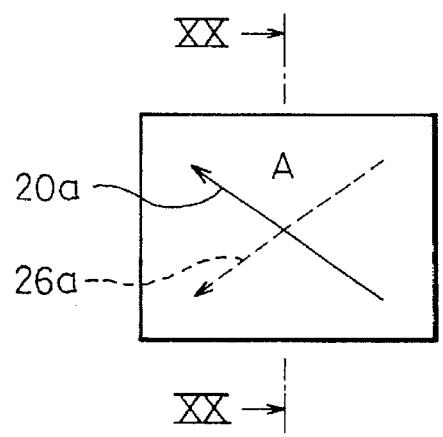
FIG. 7 is a schematic diagram showing a rubbing treatment of a TN liquid crystal.

FIG. 7 shows an example of a rubbing treatment when the twisted-nematic liquid crystal (without the alignment division) is used. A solid line arrow 22a illustrates the direction of rubbing the alignment film 22 of the lower substrate 18, while a dotted line arrow 26a illustrates the direction of rubbing the alignment film 26 of the upper substrate 16.

Figure 8:
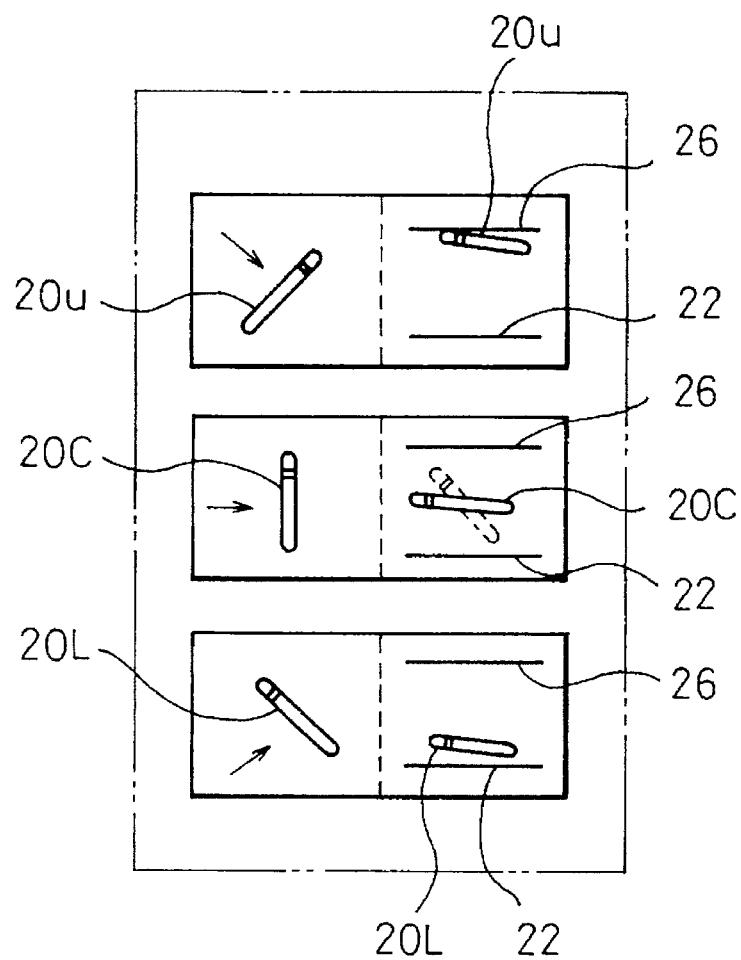
FIG. 8 is a schematic view showing the alignment of TN crystal molecules.

FIG. 8 separately shows, in the case of rubbing as shown in FIG. 7, the liquid crystalline molecule 20L in contact with the alignment film 22 of lower substrate 16, the liquid crystalline molecule 20U in contact with the alignment film 26 of the upper substrate 18 and the liquid crystalline molecule 20C located between the lower substrate 16 and the upper substrate 18. In FIG. 8, the drawings on the left side in each row show a plan view showing the alignment direction of the liquid crystalline molecule, viewed correspondingly to FIG. 7, and the drawings on the right side in each row show a cross-sectional view of the liquid crystalline molecule, viewed from the direction of the arrows in the plan views, respectively. The lower liquid crystalline molecule 20L in contact with the alignment film 22 of the lower substrate 16 has an alignment direction corresponding to the rubbing direction 22a of the alignment film 22 of the lower substrate 16 and tilts towards the right bottom. On the other hand, the liquid crystal molecule 20U in contact with the alignment film 26 of the upper substrate 18 corresponds to the rubbing direction 26a of the alignment film 26 of the upper substrate 18 and tilts towards the left top. The liquid crystal twists or rotates in the left turning direction between the lower substrate 16 and the upper substrate 18, and the intermediate liquid crystalline molecule 20C is uniformly aligned in the left top direction.

Figure 9:
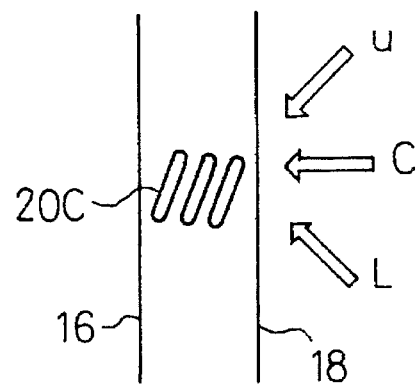
FIG. 9 is a cross-sectional view taken on line XX—XX of FIG. 7.

FIG. 9 is a cross-sectional view of the liquid crystal panel 10 of FIG. 7 after the rubbing treatment, taken along the line XX—XX of FIG. 7. Arrow C shows that the observer views the liquid crystal panel 10 from a direction normal to the upper substrate 18. Arrow U shows that the observer views the liquid crystal panel 10 obliquely at an angle of 30° from the above relative to the normal, and arrow L shows that the observer views the liquid crystal panel 10 obliquely at an angle of 30° from the below relative to the normal.

Figure 10:
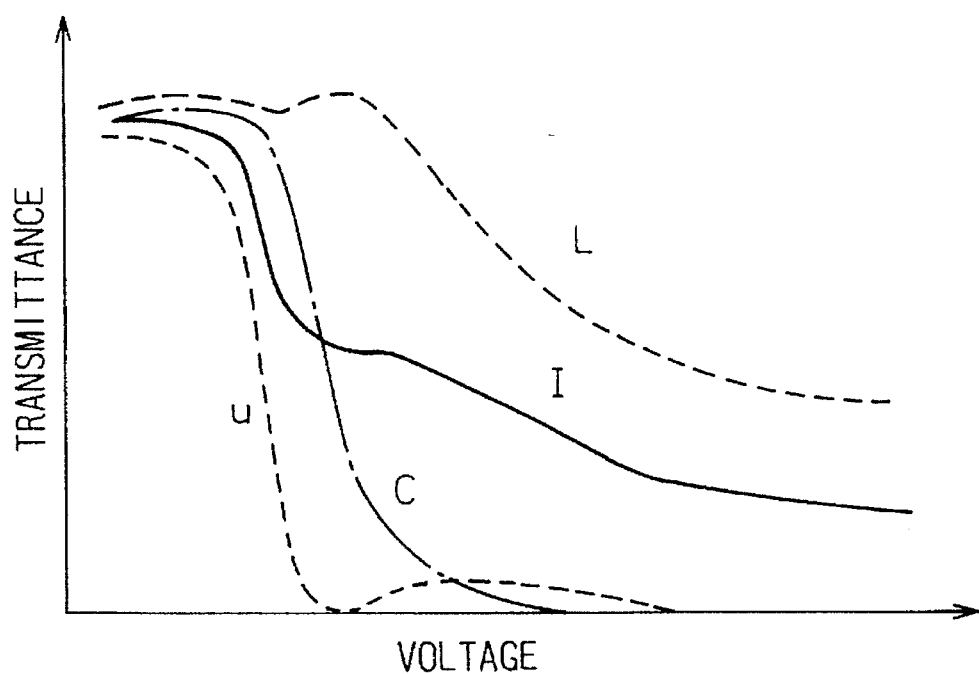
FIG. 10 is a graph showing viewing angle characteristics of a TN liquid crystal display panel.

FIG. 10 is a diagram showing viewing angle characteristics of the liquid crystal panel 10 which has been subjected to the rubbing treatment of FIG. 7. In the drawing, dashed chain line C shows a characteristic curve of voltage versus transmittance when the liquid crystal panel 10 was viewed from the arrow C of FIG. 9. Broken lines U and L show characteristic curves of voltage versus transmittance when the liquid crystal panel was viewed from the arrows U and L of FIG. 9, respectively. In the case of the broken line L, an increase in voltage leads to only a small decrease in transmittance, so that the display is relatively bright even when a black or gray pot is desired. In the case of the broken line U, the application of a low voltage results in a markedly lowered transmittance, so that an image having a high contrast can be obtained. However, the transmittance again increases with increasing the voltage, and the relationship between the voltage and the transmittance is reversed. Therefore, this often raises a problem when an intermediate color between black and white is desired.

Figure 11:
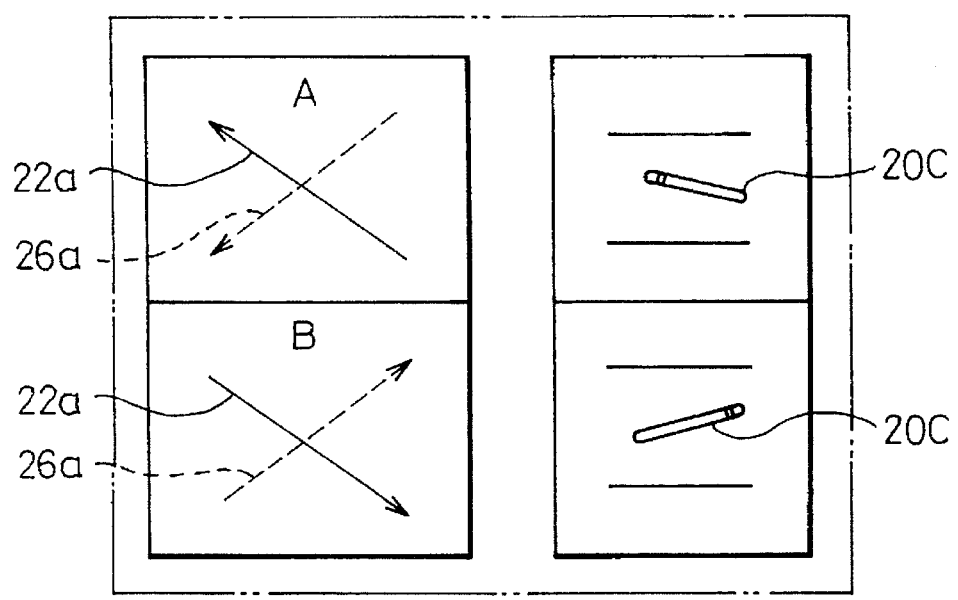
FIG. 11 is a schematic view showing a basic form of pixel division.

In order to improve these viewing angle characteristics, element division is carried out as shown in FIG. 11.

FIG. 11 shows a basic form of element division which has minute domains A and B. In the minute domain A, the rubbing treatment is carried out as shown in FIG. 7. On the other hand, in the minute domain B, the rubbing treatment is carried out in the reverse manner. That is, the direction of the broken line arrow 26a in the minute domain B is opposite to the direction of the broken line arrow 26a in the minute domain A, and the direction of the solid line arrow 22a in the minute domain B is opposite to the direction of the solid line arrow 22a in the minute domain A. As a result, the liquid crystal molecule 20C located between the lower substrate 16 and the upper substrate 18 in the minute domain B is opposite to that in the minute domain A, and thus the viewing angle characteristics are also reversed.

When such minute domains A and B are arranged adjacent to each other and the observer views the liquid crystal panel 10 form the direction of arrow U or L of FIG. 9, the characteristics represented by the solid line I of FIG. 10 can be obtained. The characteristics of the solid line I are obtained by averaging the characteristics represented by the broken line L and the characteristics represented by the broken line U and become close to that of the dotted chain line C when viewed from the normal to the liquid crystal panel. Therefore, the extremely high or low transmission viewing directions are eliminated, so that the viewing angle characteristics can be improved. This is the effect of element division. In order to carry out the rubbing treatment as shown in FIG. 11, it is necessary to effect two rubbing operations for each of the substrates as described above. Since this is troublesome, the assignee of this invention has proposed in Japanese Patent Application No. 5-212722 an example of the alignment treatment as shown in FIGS. 12 and 13 of the present application and filed a patent application (hereinafter referred to as "previous application").

Figure 12:
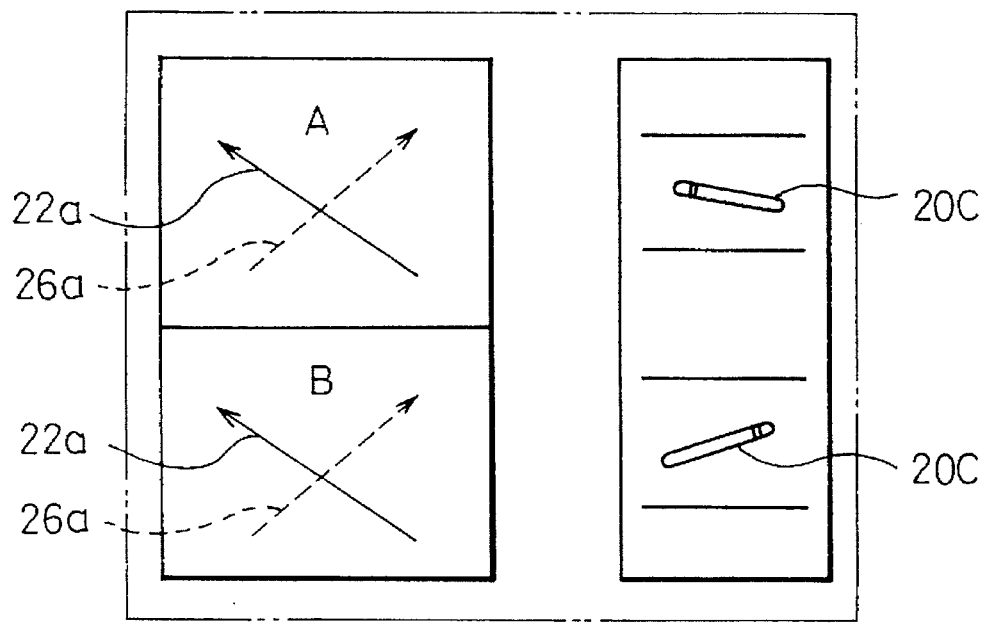
FIG. 12 is a schematic view showing an improved form of pixel division.

In FIG. 12, the rubbing treatment of the minute domain A is the same as that of the minute domain B. That is, for the alignment film 22 of the lower substrate 16, the rubbing can be carried out only in the direction of arrow 22a on both domains A and B. On the other hand, for the alignment film 26 of the upper plate 18, the rubbing can be carried out on both domains A and B in the direction of arrow 26a. It is, however, necessary to control the pretilt angles of the liquid crystal as shown in FIG. 13.

Figure 13:
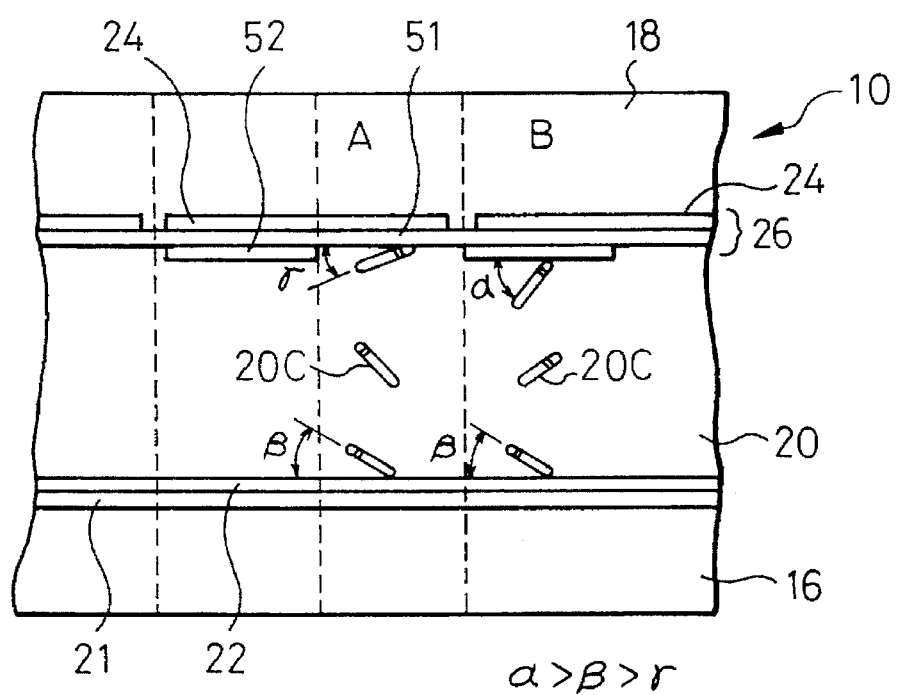
FIG. 13 is a cross-sectional view showing a construction of a liquid crystal display panel according to the previous application.

In FIG. 13, the alignment film 22 of the lower substrate 16 has a single layer structure and is designed so that the pretilt angle of the liquid crystal in contact with the rubbed alignment film 22 becomes β. The alignment film 26 of the upper substrate 18 has a two-layer structure comprising a lower alignment material layer 51 and an upper alignment material layer 52. The upper alignment material layer 52 is patterned so as to have openings corresponding to the minute domain A or B. The upper alignment material layer 52 comprises a material which may present a relatively high pretilt angle α of the liquid crystal after rubbing. The lower alignment material layer 51 comprises a material which may present a relatively low pretilt angle γ of the liquid crystal after rubbing. In this case, the relationship α>β>γ is satisfied.

In the minute domain A, the pretilt angle of liquid crystal molecules on the side of the lower substrate 16 is β, and the pretilt angle of the liquid crystal molecules on the side of the upper substrate 18 is γ with the relationship β>γ being satisfied. In the minute domain B, the pretilt angle of the liquid crystal molecules on the side of the lower substrate 16 is β, and the pretilt angle of the liquid crystal molecules on the side of the upper substrate 18 is α with the relationship α>β being satisfied.

In the previous application, the present inventors have found that when a certain difference in pretilt angle exists between the alignment films of the upper and lower substrates, the intermediate molecules 20C between the lower substrate 16 and the upper substrate 18 rise (tilt) in accordance with the rubbing treatments producing the larger pretilt angle upon the application of a voltage. It is known that the light transmittance of the liquid crystal is mainly determined by the behavior of the intermediate molecules 20C of the liquid crystal.

Accordingly, in FIG. 13, the intermediate molecules 20C of the liquid crystal in the minute domain A rise in accordance with the rubbing direction of the alignment film 22 on the lower substrate 16. The rubbing direction of the alignment film 22 on the lower substrate 16 shown in FIG. 13 corresponds to the rubbing direction 22a shown in FIG. 12 and is the same as the rubbing direction 22a in the minute domain A shown in FIG. 11. Therefore, the viewing angle characteristics in the domain A shown in FIGS. 12 and 13 are the same as those in the domain A shown in FIG. 11.

Similarly, the intermediate liquid crystal molecules 20C in the minute domain B shown in FIG. 13 are aligned along the rubbing direction of the alignment film 26 of the upper substrate 18. The rubbing direction of the alignment film 26 of the upper substrate 18 shown in FIG. 13 corresponds to the rubbing direction 26a shown in FIG. 12 and is the same as the rubbing direction 26a in the minute domain B shown in FIG. 11. Therefore, the viewing angle characteristics in the minute domain B shown in FIGS. 12 and 13 are the same as those in the minute domain B shown in FIG. 11. That is, the treatment shown in FIGS. 12 and 13 provide the same effect of the pixel division as that in FIG. 11. In the embodiments shown in FIGS. 12 and 13, one rubbing operation for each substrate suffices for attaining the contemplated purpose, so that not only the production process is simple but also the alignment of the liquid crystal is stable.

In the present invention, the previous application is further improved, and as shown in FIG. 4, for example, at least the alignment film 26 of the upper substrate 18 is constructed in a single layer structure so that different pretilt angles α and γ can be realized for each of the minute domains A and B.

Figure 14:
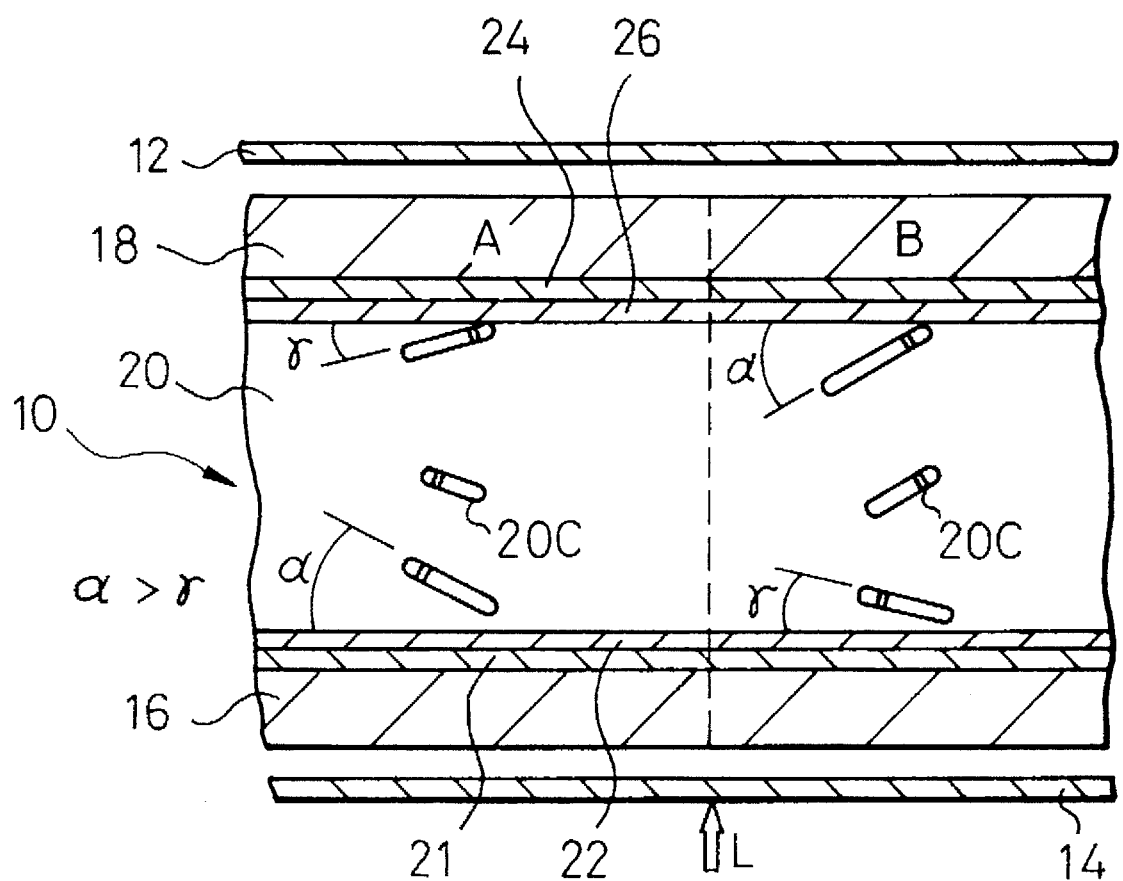
FIG. 14 is a cross-sectional view showing a modified embodiment of the liquid crystal display panel.
Figure 15A:
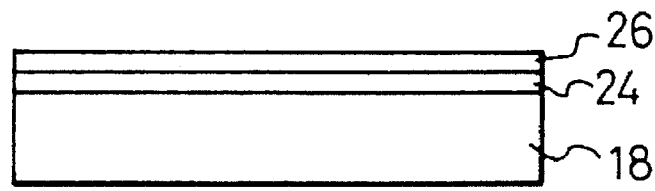
FIG. 15 is a cross-sectional view showing the first embodiment of the treatment for changing the pretilt angle.
Figure 15B:
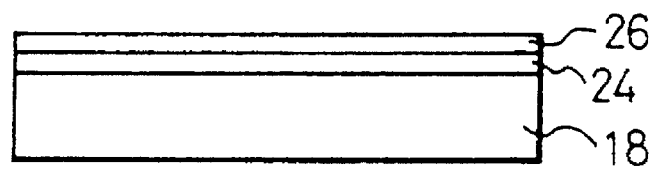
Figure 15C:
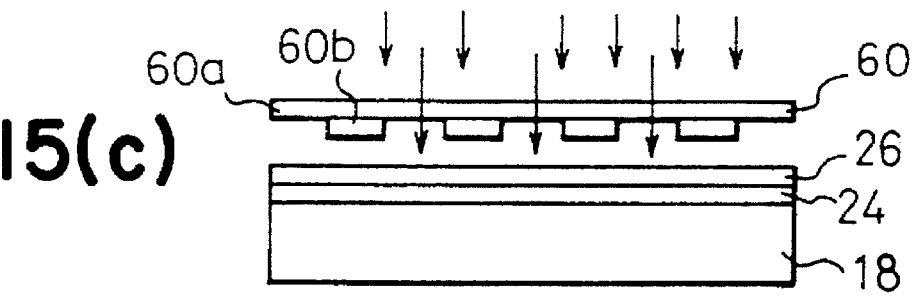
Figure 15D:
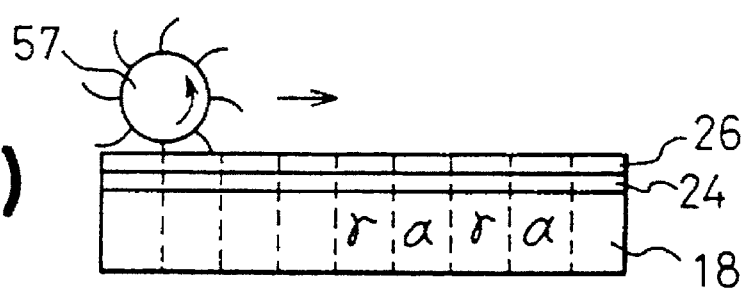
Figure 16A:
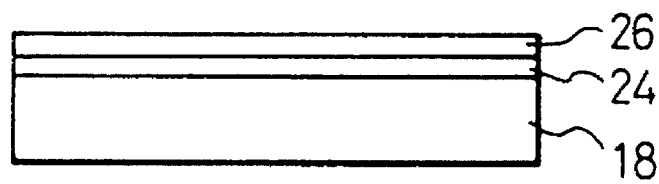
FIG. 16 is a cross-sectional view showing the second embodiment of the treatment for changing the pretilt angle.
Figure 16B:
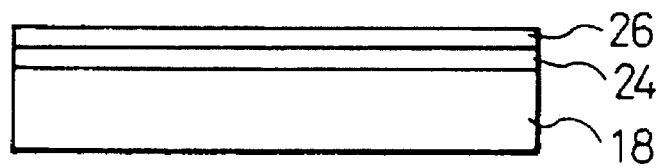
Figure 16C:
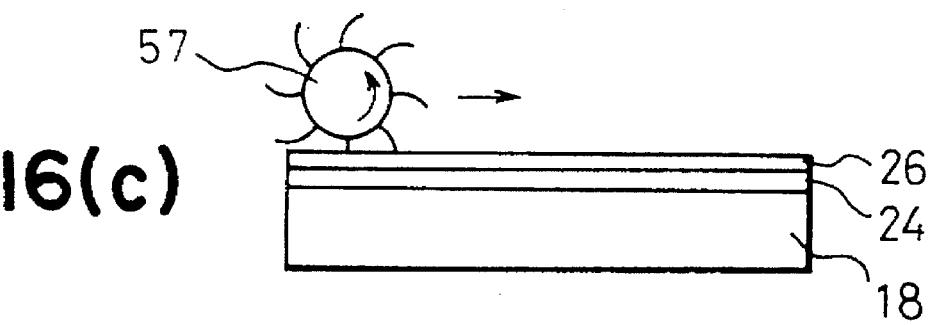
Figure 16D:
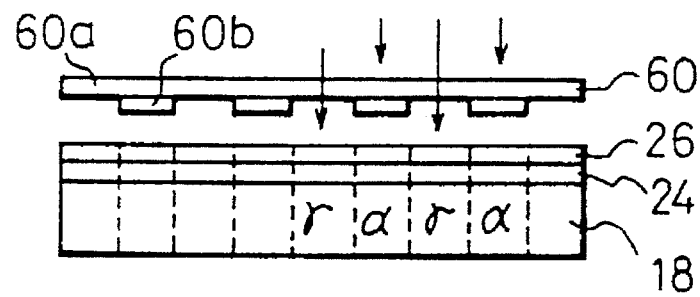

Further, as shown in FIG. 14, both the alignment films 26 and 22 of the upper and lower substrates 18 and 16 are constructed in a single layer structure so that different pretilt angles α and γ can be realized for each of the minute domains A and B. In this modified embodiment, the pretilt angles α and γ are opposite to each other in the upper and lower regions. The construction shown in FIG. 4 will be mainly described below.

In the liquid crystal display panel according to the present invention, an alignment film 26 having a single layer structure is continuously rubbed in one direction along the two minute domains A and B, as shown in FIG. 12, and, as will be described below, a further treatment, which is different from the rubbing treatment, is carried out so that the pretilt angles α and γ of the liquid crystal in contact with the alignment film 26 in the minute domains A and B are different.

FIG. 15 is a cross-sectional view successively illustrating the steps of the first embodiment for selectively changing the pretilt angles α and γ of the liquid crystal of the alignment film 26 of the upper substrate 18.

In FIG. 15, the step (a) comprises applying an alignment film 26 on the surface of an upper substrate 18 by spin coating. In this case, the application of the alignment film 26 on the surface of the upper substrate 18 means that, if the upper substrate 18 has thereon an element electrode 24 or the like, the alignment film 26 is applied onto the element electrode 24 or the like. In this case, the alignment film 26 comprises a polyimide which has a degree of imidation of 100% and a high pretilt angle. This type of polyimide is usually called a "soluble polyimide" and prepared by dissolving various polyimide components in a solvent. The polyimide components include chemical components, such as diamine, which can govern the pretilt angle. For example, alignment materials such as JALS219 and JALS214 manufactured by Japan Synthetic Rubber Co., Ltd. can be used as the above alignment material.

In FIG. 15 (b), the alignment film 26 of the upper substrate 18 is cured in an oven or the like to evaporate the solvent and, at the same time, to harden the alignment film 26.

In FIG. 15 (c), the minute domains A and B are selectively irradiated with ultraviolet light using a mask 60. The mask 60 comprises a plate 60a made of quartz or synthetic quartz permeable to UV light and a layer of UV blocking material 60b, such as chromium, attached to the plate 60a in correspondence with either of the domains A or B.

In FIG. 15 (d), the alignment film 26 is rubbed using a rubbing roller 57. In this case, rubbing as shown in FIG. 12 is possible.

FIG. 16 is a cross-sectional view successively illustrating the steps of the second embodiment for selectively changing the pretilt angles α and γ of the liquid crystal of the alignment film 26 of the upper substrate 18. As with the embodiment shown in FIG. also in this embodiment, the step (a) comprises applying an alignment film 26 on the surface of the upper substrate 18, and in the step (b), the alignment film 26 of the upper substrate 18 is cured. Then, opposite to the embodiment shown in FIG. 15, the alignment film 26 is rubbed in the step (c), and in the step (d), the minute domains A and B are selectively irradiated with ultraviolet light using a mask 60.

In FIGS. 15 and 16, by virtue of the selective irradiation of the minute domains A and B with ultraviolet light, the unexposed minute domain A shows a high pretilt angle α depending upon the nature of the material comprising the polyimide used for the alignment film material and the degree of the rubbing treatment. On the other hand, in the minute domain B irradiated with ultraviolet light, the surface energy of the alignment film 26 increases, and the pretilt angle γ thereof becomes smaller as compared with that presented by the nonexposed polyimide and the rubbing treatment. This enables, for example, a combination of a pretilt angle α of 8°, a pretilt angle β of 4° and a pretilt angle γ of 1° to be provided.

Figure 17:
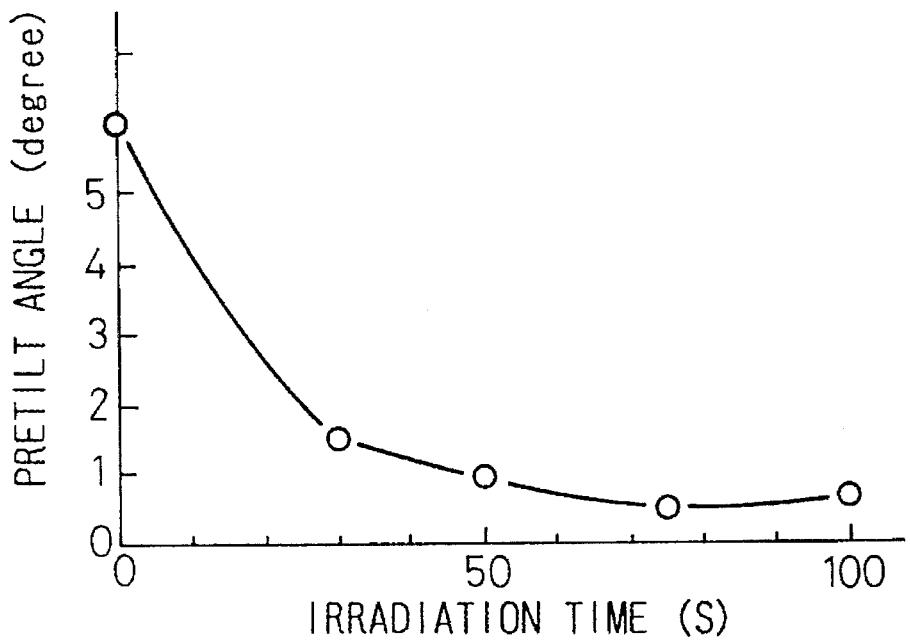
FIG. 17 is a graph showing the relationship between the UV irradiation time and the pretilt angle.
Figure 18:
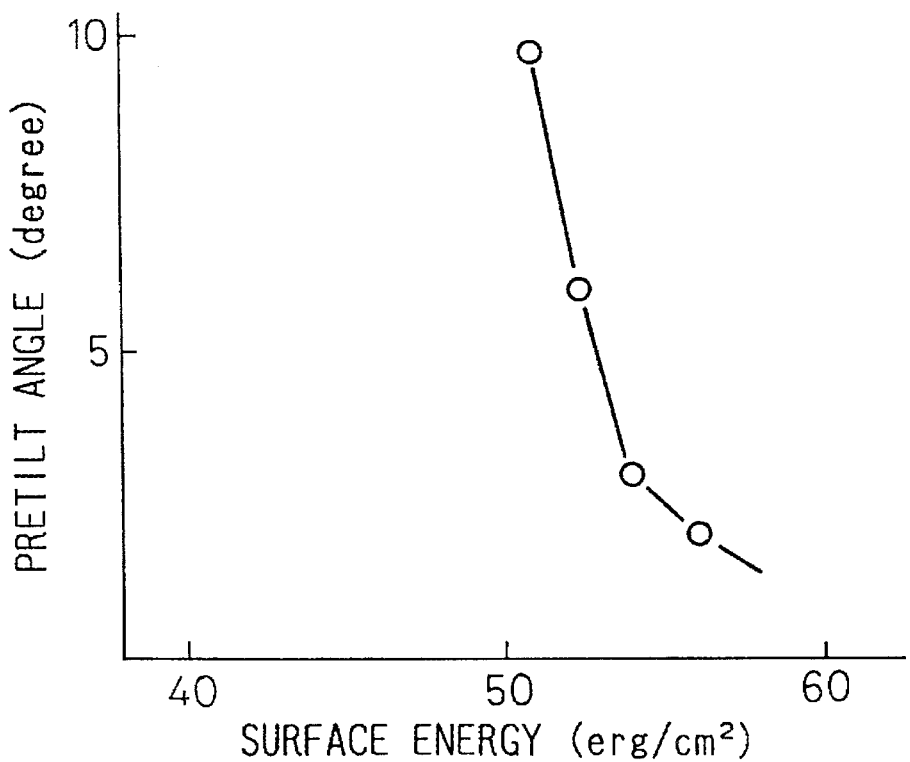
FIG. 18 is a graph showing the relationship between the surface energy and the pretilt angle.

FIGS. 17 and 18 (graphs) show that the UV irradiation leads to a decrease in pretilt angle γ. As is apparent from FIG. 17, the longer the UV irradiation time, the smaller the pretilt angles. The UV irradiation increases the surface energy of the alignment film 26. As shown in FIG. 18, an increase in surface energy of the alignment film 26 improves the wettability of the alignment film 26, lowers the contact angle and reduces the pretilt angle. The experimental fact that the pretilt angle decreases with increasing the surface energy of the alignment film 26 will be used in the following embodiment.

In order to reduce the pretilt angle by taking advantage of UV irradiation, it is necessary to use UV light having a high energy enough to break the polyimide linkage on the surface of the alignment film 26. The use of UV light with wavelength of not more than 300 nm is preferred, and the use of UV light with wavelength of not more than 260 nm is still preferred. In this embodiment, a low pressure mercury lamp capable of emitting mainly UV light with wavelength of 253.7 nm and 184.9 nm was used at 10 mW/cm$^2$.

FIG. 19 is a schematic diagram showing an embodiment of the production of a combination of an alignment film 26 on an upper substrate 18 with an alignment film 22 on a lower substrate 16 as shown in FIG. 4, in which process UV radiation is utilized. In this embodiment, the same type of alignment film material is used for both alignment films 26 and 22 on the upper and lower substrates 18 and 16, respectively, so that the liquid crystal can show almost the same pretilt angles if an identical rubbing treatment is carried out.

FIG. 19 (a) shows the step of subjecting the alignment film 26 on the upper substrate 18 to an alignment treatment. At the outset, the whole surface is rubbed with a rubbing roller 57 so that the liquid crystal, which comes into contact with the alignment film 26, has a pretilt angle of α. Next, UV light is applied through a mask 60. The pretilt angle α is maintained in the domain B which has not been exposed to the UV light. On the other hand, the pretilt angle γ is established in the minute domain A which has been exposed to the UV light. The rubbing operation and the UV irradiation can be carried out in the reverse order.

FIG. 19 (b) shows the step of subjecting the alignment film 22 of the lower substrate 16 to an alignment treatment. At the outset, the whole surface is rubbed with a rubbing roller 57 so that the liquid crystal, which comes into contact with the alignment film 26, has a pretilt angle of α. Then, unlike FIG. 19 (a), UV light is applied without use of any mask so that the pretilt angle becomes β. Also in this case, the rubbing operation and the UV irradiation can be carried out in the reverse order. Thus, alignment films 22 and 26 satisfying the relationship α>β>γ can be prepared.

FIG. 20 is a schematic diagram showing another embodiment of the production of a combination of an alignment film 26 on an upper substrate 18 with an alignment film 22 on a lower substrate 16.

FIG. 20 (a) shows the step of subjecting the alignment film 26 on the upper substrate 18 to an alignment treatment. At the outset, the whole surface is rubbed with a rubbing roller 57 so that the liquid crystal, which comes into contact with the alignment film 26, has a pretilt angle α. Then, the alignment film 26 is irradiated with UV light through a mask 60. The pretilt angle α is maintained in the minute domain B which has not been exposed to the UV light. On the other hand, the pretilt angle γ is established in the minute domain A which has been exposed to the UV light.

FIG. 20 (b) shows the step of subjecting the alignment film 22 on the lower substrate 16 to an alignment treatment. In this step, rubbing is carried out in such a manner that the liquid crystal, which comes into contact with the alignment film 26, has a pretilt angle of β. The same or different material can be used for the alignment films 26 and 22. What is indispensable in this case is to provide different pretilt angles by taking advantage of a combination of the alignment film material with rubbing. If the same material is used, different pretilt angles are provided by controlling the number of times of rubbing. Also in this case, the relationship α>β>γ should be satisfied.

Figure 21:
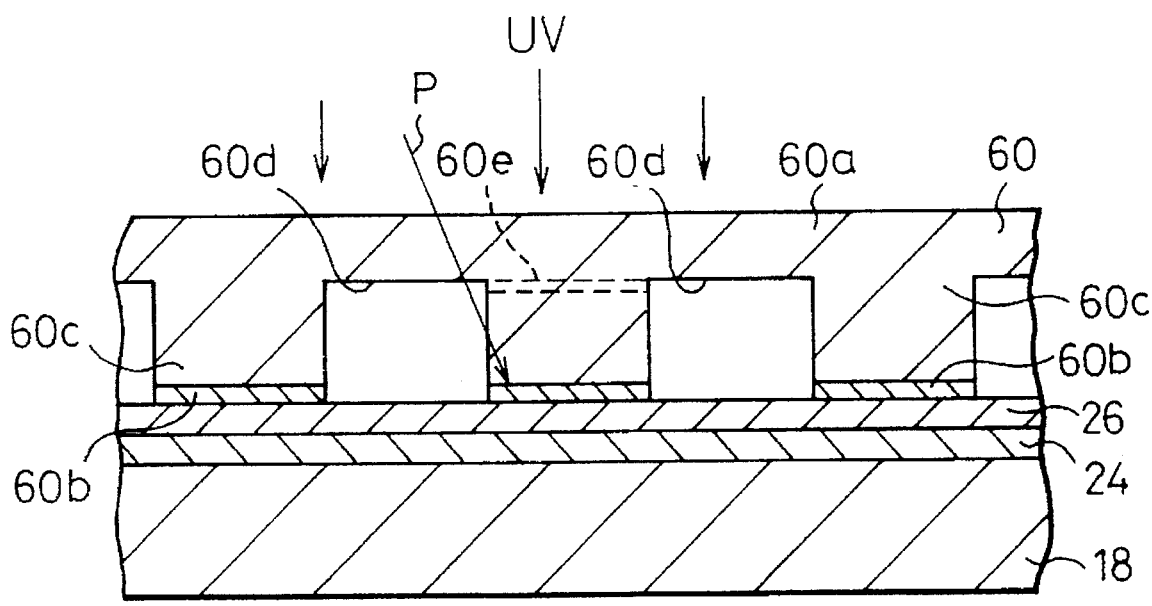
FIG. 21 is a cross-sectional view showing a modified embodiment of the mask used in UV irradiation.

FIG. 21 is a cross-sectional view of a modified embodiment of the mask 60 used for changing the pretilt angles α and γ through UV irradiation. The mask 60 comprises a plate 60a made of quartz or synthetic quartz permeable to UV light and, laminated thereto, an UV blocking material layer 60b made of chromium which blocks UV light. In this modified embodiment, the plate 60a permeable to UV light is provided with protrusions 60c, and the Uv blocking material layer 60b is attached to the surface of the protrusions 60c. Accordingly, the surface of the UV blocking material layer 60b is protruded from the plate 60a permeable to UV light on its surface 60d which is open between the UV blocking material layers 60b.

According to this construction, UV irradiation can be carried out with the UV blocking material layer 60b being close to the alignment film 26 of the upper substrate 18 as much as possible or in contact with the alignment film 26. In this case, even though the UV light arrives obliquely at the mask 60, as indicated by the arrow P, this structure can prevent the UV light from reaching the domains under the UV blocking material layer 60b. If the UV blocking material 60b layer is located at the position indicated by the broken line 60e, the UV light indicated by the arrow P will reach the alignment film in its domain where the UV light is to be blocked, bypassing UV blocking material 60e, which is unfavorable.

Figure 22:
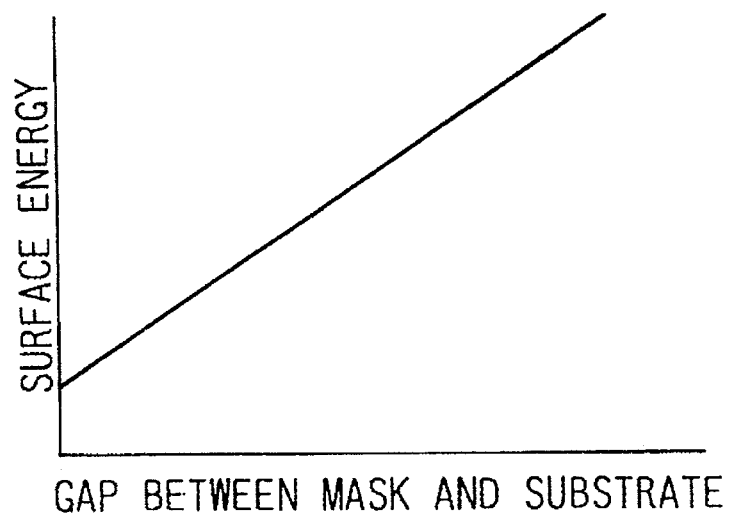
FIG. 22 is a graph showing the relationship between the mask-substrate gap and the surface energy.

If the plate 60a is flat, it is desirable to bring the whole plate 60a closer to the alignment film 26 for the purpose of preventing the oblique UV light from passing under the UV blocking material layer 60e. If so arranged, however, the plate 60a on its surface 60d which is open between the UV blocking material layers 60b becomes excessively close to the alignment film 26. When the gap between the surface portions 60d of openings of the mask 60 and the alignment film 26 of the upper substrate 18 is small, the amount of ozone generated in the gap decreases, which results in lowered effect of modifying the surface of the alignment film 26 by the UV irradiation. That is, FIG. 22 is a graph showing the relationship of the gap between the surface portions 60d of the opening of the mask 60 and the alignment film 26 of the upper substrate 18 with the surface energy (which affects the pretilt angle) of the alignment film 26. As is apparent from the drawing, the smaller that gap between the mask and the substrate, the smaller the surface energy of the alignment film 26. It is, therefore, desirable to bring the UV blocking material layer 60b closer to the alignment film 26 and, at the same time, to make a proper gap between the opening surface portions 60d and the alignment film 26 of the upper substrate 18.

Figure 23:
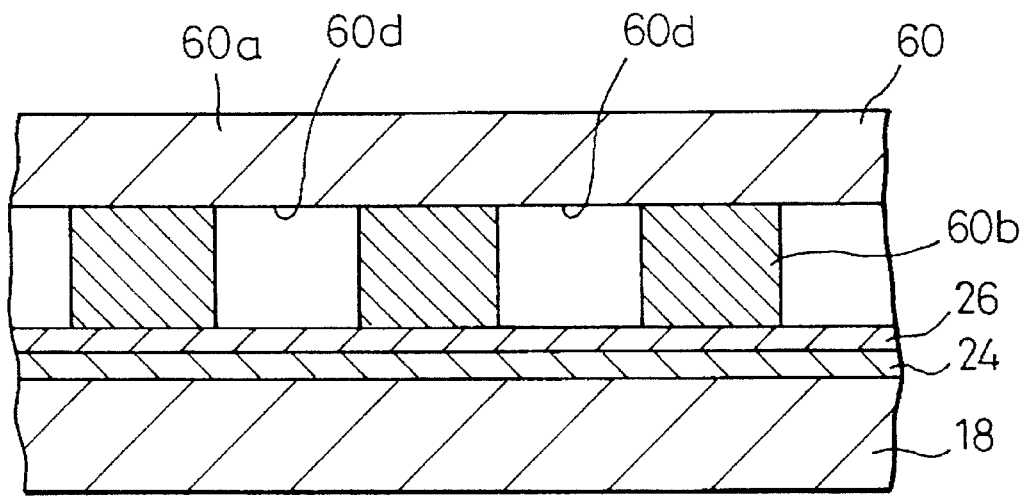
FIG. 23 is a cross-sectional view showing a modified embodiment of the mask used in UV irradiation.

FIG. 23 is a cross-sectional view of another modified embodiment of the mask shown in FIG. 21. In this embodiment, the Uvblocking material layer 60b attached to the plate 60a permeable to UV light in the mask 60 has a relatively large thickness to attain the same effect as the embodiment shown in FIG. 21. In this case, the UV blocking material layer 60b preferably comprises an UV blocking resin.

Figure 24:
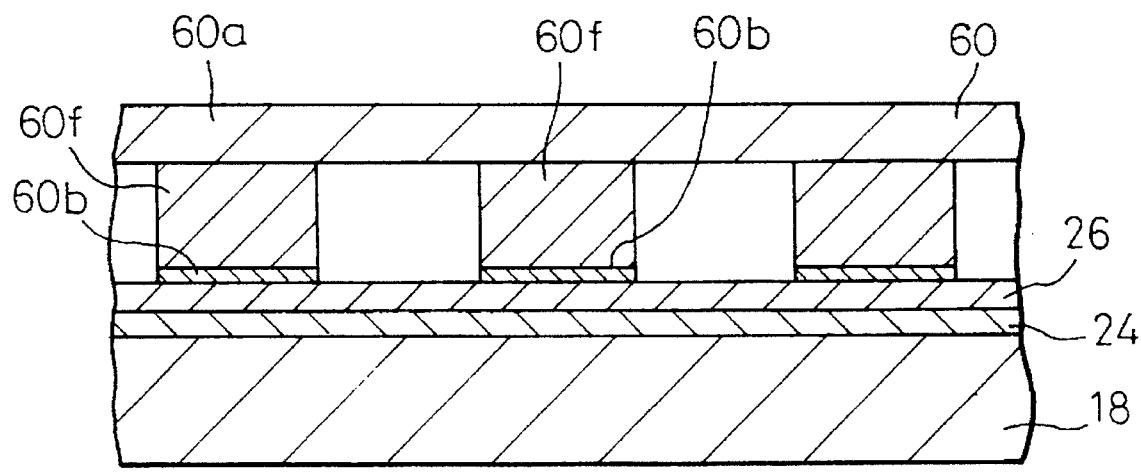
FIG. 24 is a cross-sectional view showing another modified embodiment of the mask used in UV irradiation.

FIG. 24 is a cross-sectional view of a further modified embodiment of the mask shown in FIG. 21. According to this embodiment, in the mask 60, a spacer 60f is provided between the plate 60a permeable to UV light and the UV blocking material layer 60b so that the same effect as attained by the embodiment shown in FIG. 21 can be attained. In this case, the UV blocking material layer 60b comprises chromium, and the spacer 60f comprises a suitable resin.

FIG. 25 is a cross-sectional view successively illustrating the steps of the third embodiment for selectively changing the pretilt angles α and γ of the liquid crystal of the alignment film 26 of the upper substrate 18. In this embodiment, the concentration distribution of chemical components of the alignment film 26 which govern the pretilt angles on the surface of the minute domains A and B are selectively changed.

In the embodiment shown in FIG. 25, the step (a) comprises coating an alignment film 26 on the surface of an upper substrate 18, and the step (b) comprises curing the alignment film 26 of the upper substrate 18, the step (c) comprises forming a resist mask 54 on the alignment film 26 and slightly etching the surface portion of the alignment film 26 of the domains A, and the step (d) comprises rubbing the alignment film 26 using a rubbing roller 57 as shown in FIG. 12.

FIG. 14 is a partially enlarged cross-sectional view of the alignment film 26 which has been subjected to etching in the step (c) shown in FIG. 25. The material for the alignment film 26 comprising a polyimide is generally called a "soluble polyimide" and prepared by dissolving various polyimide components in a solvent. The polyimide components include chemical components governing particularly the pretilt angle, such as diamines, and chemical components having no significant effect on the pretilt angle. The chemical components governing the pretilt angle are usually hydrophobic and likely to concentrate on the surface of the film in a low-humidity atmosphere such as in air and nitrogen. When the precure temperature in curing of the alignment film 26 is as low as possible, the chemical components governing the pretilt angle concentrate to a considerable extent on the surface of the alignment film 26.

Figure 25A:
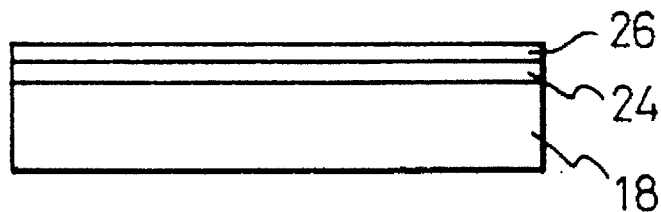
FIG. 25 is a cross-sectional view showing the third embodiment of the treatment for changing the pretilt angle.
Figure 25B:
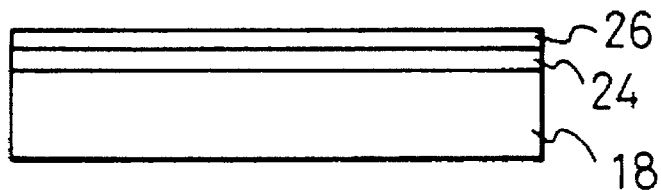
Figure 25C:
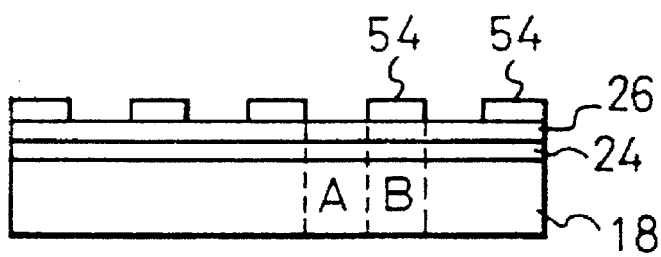
Figure 25D:
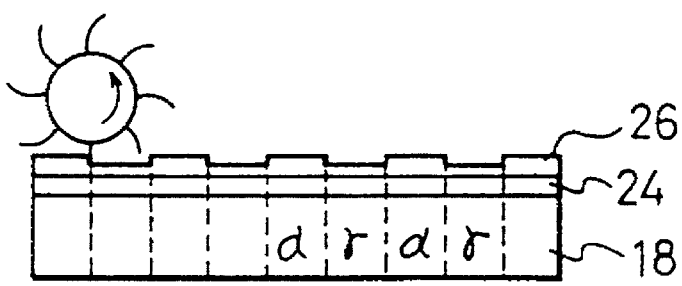
Figure 26:
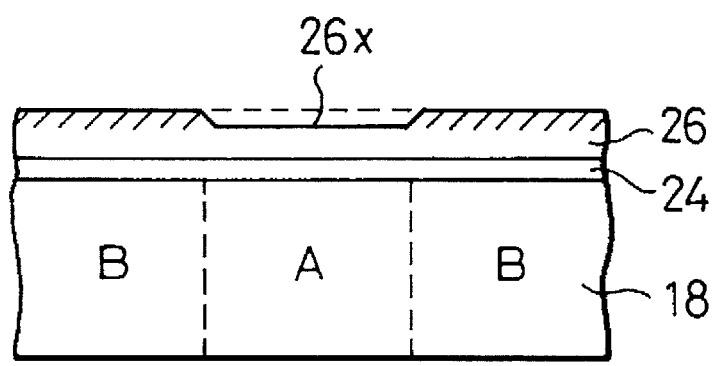
FIG. 26 is an enlarged cross-sectional view of a substrate.

In FIG. 26, the concentration of the chemical components governing the pretilt angle on the surface of the alignment film 26 is shown by hatching. Selective change in shape of the surface portion of the alignment film 26, where chemical components governing the pretilt angle concentrate, provides two portions, one of which is rich in chemical components governing the pretilt angle and the other does not contain such chemical components, thus enabling different pretilt angles α and γ of the liquid crystal to be provided. In the embodiment shown in the drawing, etching is used for changing the shape of the surface of the alignment film 26. In FIG. 26, the surface portion 26x corresponding to the minute domain A of the alignment film 26 is slightly removed by etching in the step (c) shown in FIG. 25. The adjacent minute domain B contains large amounts of chemical components governing the pretilt angle. In order to reduce for the developing solution to attack the alignment film during resist patterning, the postcure temperature in the curing of the alignment film 26 is preferably as high as possible (for example, about 300° C). When the alignment film material is JALS-214 manufactured by Japan Synthetic Rubber Co., Ltd., the post cure temperature is preferably in the range of from 250° to 300° C. When a polyamic acid type polyimide, for example, CRD-4022 manufactured by Sumitomo Bakelite Co., Ltd., is used, the postcure temperature may be 200° C. or below because this polyimide has relatively high chemical resistance.

Figure 27:
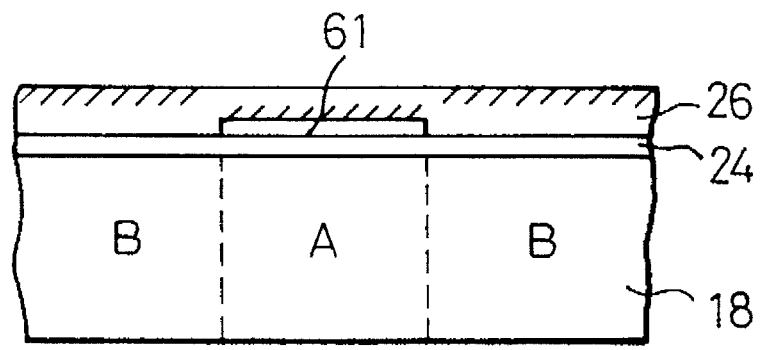
FIG. 27 is an enlarged cross-sectional view showing a modified embodiment of the substrate.
Figure 28A:
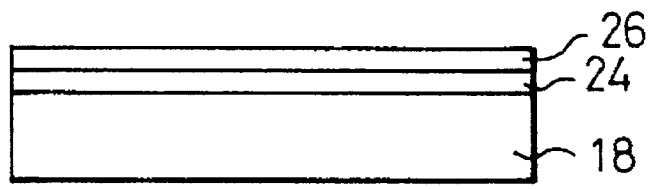
FIG. 28 is a cross-sectional view showing the fourth embodiment of the treatment for changing the pretilt angle.
Figure 28B:
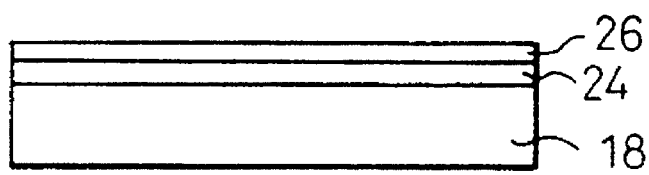
Figure 28C:
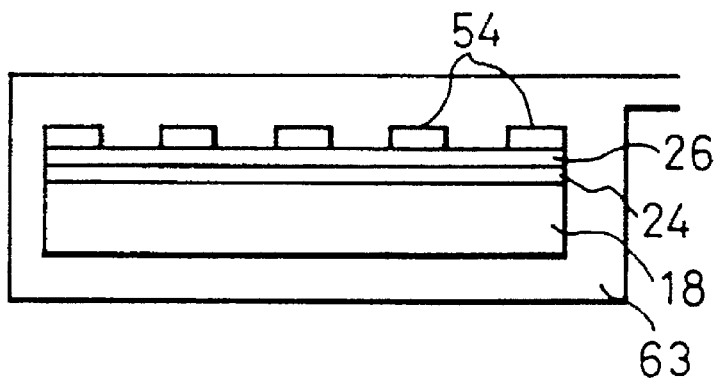
Figure 28D:
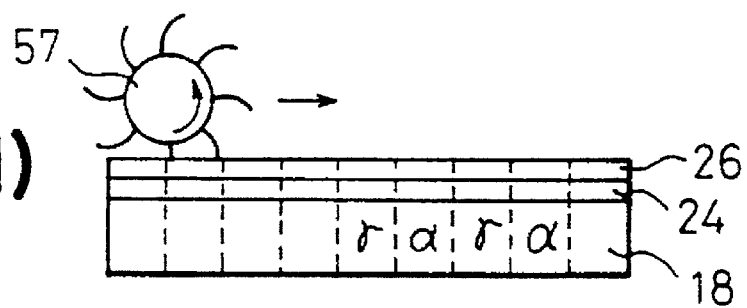
Figure 29A:
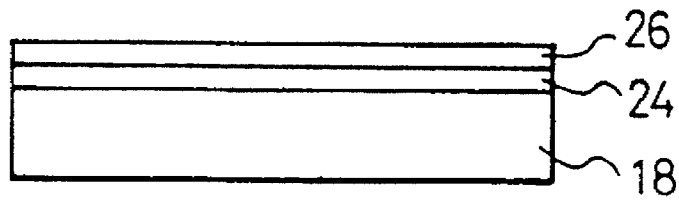
FIG. 29 is a cross-sectional view showing the fifth embodiment of the treatment for changing the pretilt angle.
Figure 29B:
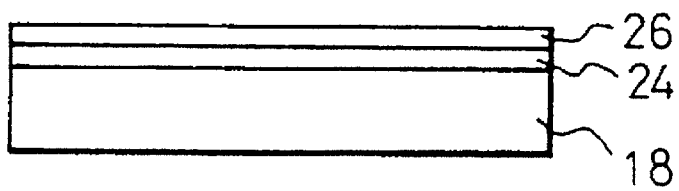
Figure 29C:
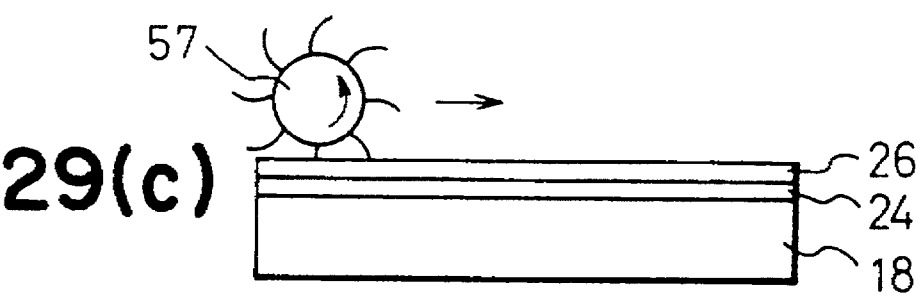
Figure 29D:
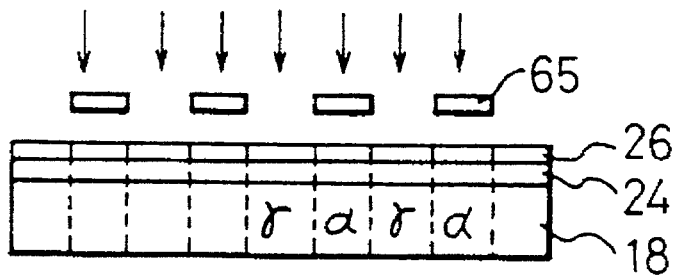

In an embodiment shown in FIG. 27, a means for selectively changing the hydrophobicity of the alignment film 26 is used between the upper substrate 18 and the alignment film 26 for the purpose of selectively changing the distribution of the chemical components governing the pretilt angle on the surface of the minute domains A and B. More specifically, an amorphous silicon layer 61 is used as a substrate of the alignment film 26 on a region corresponding to the minute domain A. The amorphous silicon having no surface oxide film is hydrophobic. Therefore, in the alignment film 26 in its portion in contact with the amorphous silicon layer 61 in the domain A, the chemical components governing the pretilt angle concentrate near the amorphous silicon layer 61, so that the amount of the chemical components governing the pretilt angle on the surface of the alignment film 26 becomes small as a whole. As with FIG. 26, also in FIG. 27, the portions where the chemical components governing the pretilt angle concentrate are shown by hatching. It is apparent that the surface of the minute domains B adjacent to the minute domain A contains larger amounts of chemical components governing the pretilt angle.

FIG. 28 is a cross-sectional view successively illustrating the steps of the fourth embodiment for selectively changing the pretilt angles $\alpha$ and $\gamma$ of the liquid crystal of the alignment film 26 of the upper substrate 18. In this embodiment, a material layer, which serves to increase or decrease the pretilt angle, is selectively attached to the surface of the minute domains A and B. More specifically, the step of attaching a material layer capable of increasing or decreasing the pretilt angle comprises selectively depositing a material layer having such a property as to align the liquid crystal in a direction perpendicular to the surface of the substrate.

In the embodiment shown in FIG. 28, the step (a) comprises coating an alignment film 26 on the surface of the upper substrate 18, the step (b) comprises curing the alignment film 26 of the upper substrate 18, the step (c) comprises placing the upper substrate 18 in a chamber 63 and introducing a nitrogen gas containing 1000 ppm of siloxane gas into the chamber 63 to deposit the siloxane onto the alignment film 26, and the step (d) comprises rubbing the alignment film 26 with a rubbing roller 57 as shown in FIG. 12.

Before the step (c) shown in FIG. 25C, a resist mask 54 is formed on the alignment film 26 to cover the portions corresponding to minute domains A of the alignment film 26 with the portions corresponding to the minute domains B being kept exposed. Accordingly, in the step (c) shown in FIG. 25C, siloxane deposits on the portion corresponding to the domains B of the alignment film 26. The siloxane is known as a material which has such a property as to align the liquid crystal in a direction perpendicular to the surface of the substrate. Therefore, the pretilt angle of the liquid crystal in the minute domain B is in the range of 5° to 10° which is larger than that of the domain A where no siloxane is deposited. In this case, the alignment film material used is such that the pretilt angle becomes 1° to 2° by the conventional rubbing treatment. Thus, the pretilt angle in the minute domain A is 1° to 2°. When the alignment film 26 is allowed to stand in a nitrogen gas containing 1000 ppm of siloxane for 10 min, the pretilt angle in the minute domain B becomes 6° to 7°. Immersion of the alignment film 26 in a siloxane solution may be carried out instead of the treatment of the alignment film 26 in a siloxane gas.

FIG. 29 is a cross-sectional view successively illustrating the steps of the fifth embodiment of the treatment for changing the pretilt angles $\alpha$ and $\gamma$ of the liquid crystal of the alignment film 26 on the upper substrate 18. This embodiment include the step of selectively heating the minute domains A and B.

In the embodiment shown in FIG. 29, the step (a) comprises coating an alignment film 26 on the surface of the upper substrate 18, the step (b) comprises curing the alignment film 26 of the upper substrate 18, the step (c) comprises rubbing the alignment film 26 using a rubbing roller 57 as shown in FIG. 12, and the step (d) comprises selectively heating the alignment film 26 through a mask 65 using a heat source such as an infrared heater, for example, to 200° C. If the pretilt angle of the liquid crystal in contact with the alignment film 26 becomes $\alpha$ when rubbed, heating of the minute domain A by the infrared heater after rubbing slightly relieves the effect of rubbing on the alignment film 26, so that the pretilt angle is reduced from $\alpha$ to $\gamma$.

Figure 30:
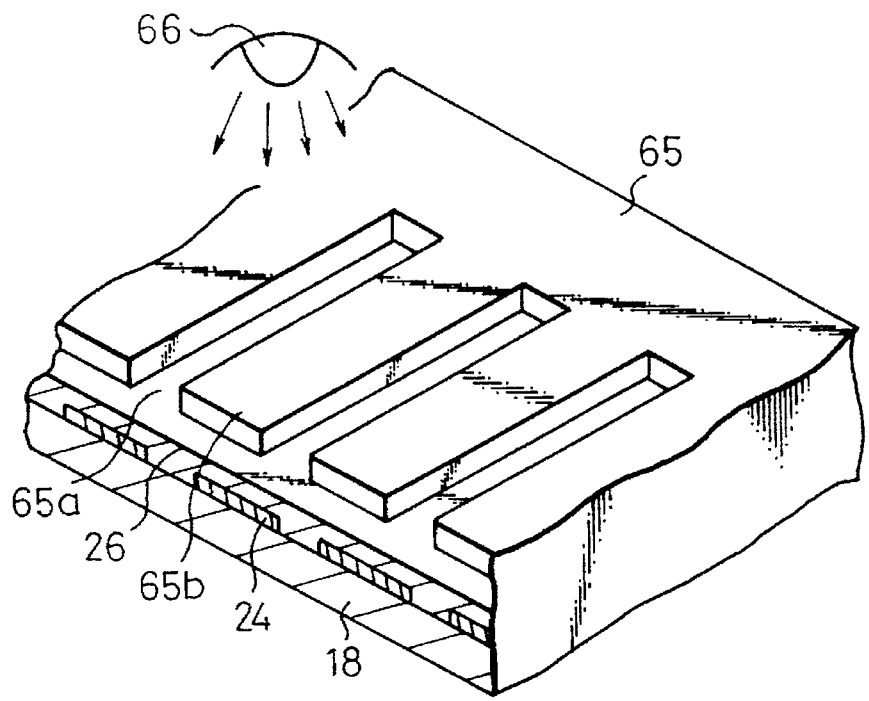
FIG. 30 is a perspective view showing an embodiment of heating means.

FIG. 30 is a perspective view of an infrared heater 66 which can be used as the heating means shown in FIG. 29. In this case, the mask 65 is shaped in a comb-like form, including portions 65a, through which heat can be passed, and heat blocking portions 65b. The portions 65a, through which heat can be passed, and heat blocking portions 65b each have a pitch substantially corresponding to one half of the pixel pitch.

Figure 31:
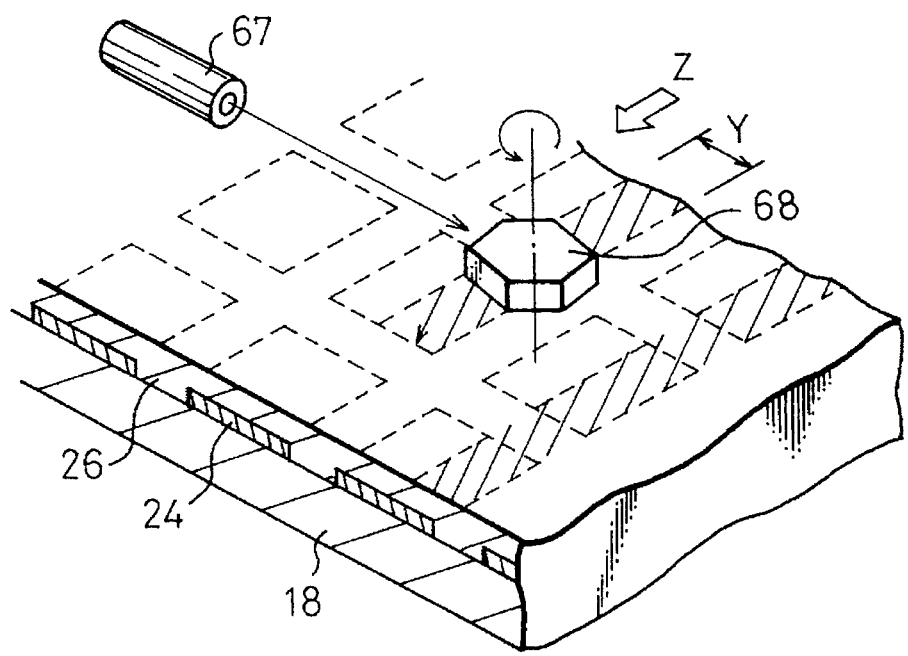
FIG. 31 is a perspective view showing another embodiment of heating means.
Figure 32A:
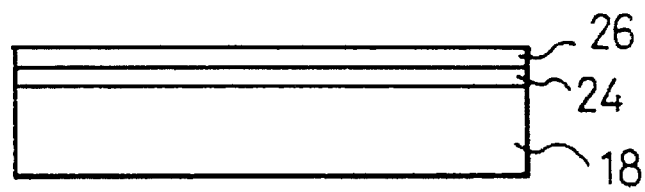
FIG. 32 is a cross-sectional view showing the sixth embodiment of the treatment for changing the pretilt angle.
Figure 32B:
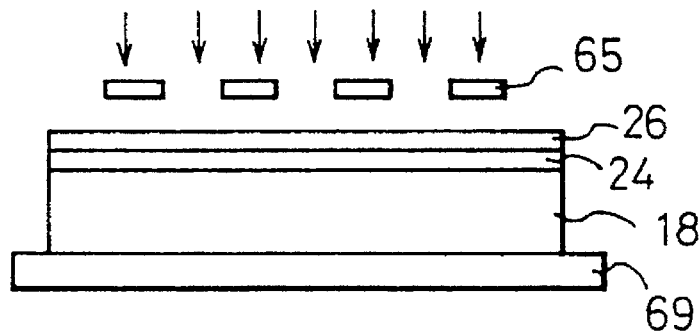
Figure 32C:
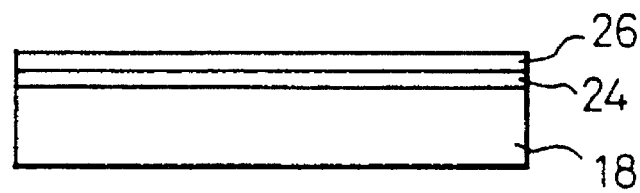
Figure 32D:
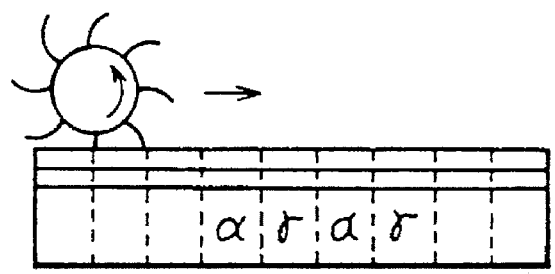

FIG. 31 is a perspective view of a laser source 67 which can be used as the heating means shown in FIG. 29. In the drawing, a scanning means for selectively scanning the laser beam emitted from the laser source 67 is also provided. The laser beam scanning means comprises a polygon mirror 68 which is rotatable about its axis and scans the laser beam in the direction of the width (Y) of the domain A to be heated. The laser source 67 and the polygon mirror 68 are movable in the longitudinal direction (Z direction) of the minute domain A to be heated. Therefore, the minute domain A can be heated in a strip form.

FIG. 32 is a cross-sectional view successively illustrating the steps of the sixth embodiment of the treatment for changing the pretilt angles $\alpha$ and $\gamma$ of the liquid crystal of the alignment film 26 on the upper substrate 18. In this embodiment, the step (a) comprises coating an alignment film 26 on an upper substrate 18, and the step (b) comprises selectively precuring the minute domains A and B so that the solvent evaporation time varies. In the precuring, the upper substrate 18 is placed on a hot plate 69 and heated from above by the infrared heater. A mask 65 is used to positively heat the minute domain A while shielding the minute domain B.

Figure 33:
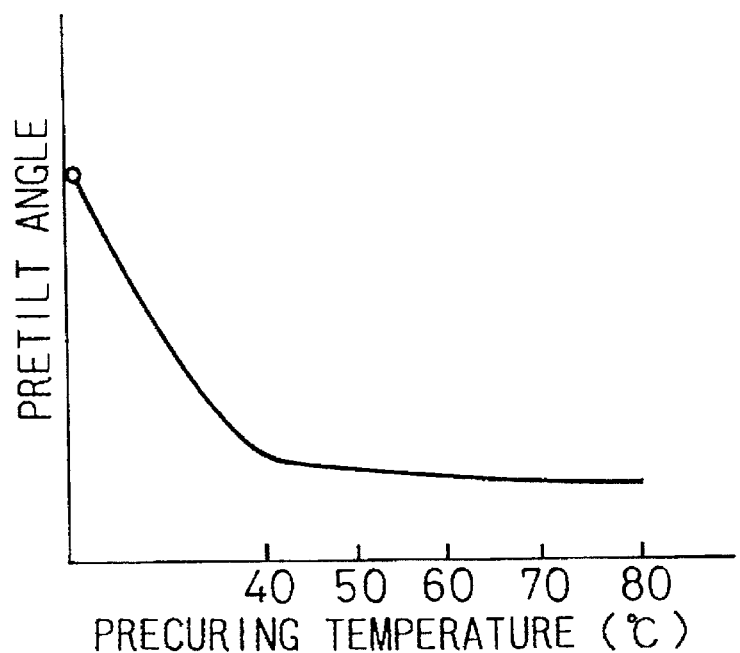
FIG. 33 is a graph showing the relationship between the curing temperature and the pretilt angle.

The precuring treatment changes the pretilt angle. As is apparent from FIG. 33 showing the relationship between the curing temperature and the pretilt angle, the pretilt angle increases with lowering the precuring temperature (i.e., increasing the precuring time). Therefore, postcuring in the step (c) after the completion of the precuring followed by rubbing in the step (d) causes the pretilt angle of the minute region B, which has been precured while being shielded by the mask 65, to become $\alpha$ with the pretilt angle of the minute domain A becoming $\gamma$.

Figure 34:
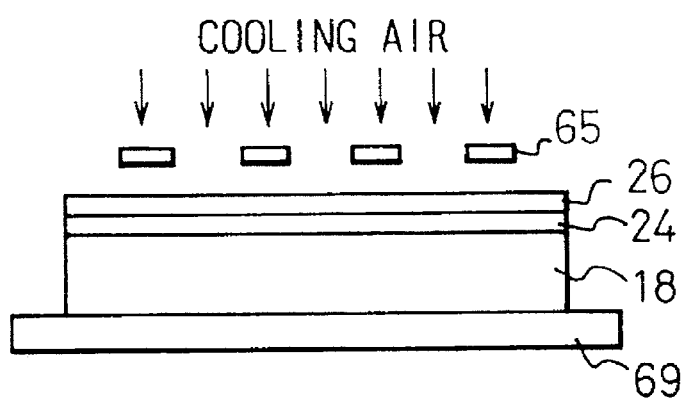
FIG. 34 is a cross-sectional view showing a modified embodiment of precuring.

FIG. 34 is a modification embodiment of precuring shown in FIG. 32. Specifically, in this embodiment, the alignment film 26 of the upper substrate 18 is selectively cooled instead of selectively heating the alignment film 26 of the upper substrate 18 by an infrared heater in the step (b) shown in FIG. 32. However, since the upper substrate 18 is placed on the hot plate 69, the alignment film 26 is heated as a whole, and the cooling air is used for regulating the precuring temperature.

EXAMPLE 1

A TFT substrate and a CF substrate were washed with running water and coated with a solution of a polyimide having a ketone group dissolved in N-methylpyrrolidone (NMP) by means of a printing machine. The resultant coatings on the substrates were calcined by heating at 120° C. for one min and then baked at 180° C. for one hr. The alignment films thus obtained had a thickness of 500 Å. Then, the substrates were mounted on a proximity exposer and irradiated with UV light having wavelength of not less than 300 nm at 1000 mJ/cm$^2$ through a photomask to selectively modify the alignment film. The substrates after the completion of UV irradiation was allowed to stand in air having a humidity of not less than 20% for 1 min. This caused the long chain portion of the polyimide molecule to be reacted with water molecules in the air, resulting in a change in molecular structure (see the reaction formula 1). As a result, the surface energy of the alignment film could be changed to provide alignment division type liquid crystal display panels having minute domains different from each other in pretilt angle.

As a modified embodiment, the above procedure was repeated, except that the wavelength of the UV light was less than 300 nm. As a result, the decomposition reaction of the long chain portion in the polyimide molecule occurred in addition to the above reaction of the polyimide. This gave rise to a further change in surface energy of the alignment film to form alignment domains which were more distinctly different from each other in pretilt angle.

EXAMPLE 2

The procedure of Example 1 was repeated, except that the alignment film material used was the following polyimides instead of the polyimide containing a ketone group.

A polyimide containing a peroxide

A polyimide containing an ester

A polyimide containing an amine

A polyimide containing an amide

All the above polyimides reacted with moisture, oxygen or hydrogen contained in the air to provide alignment films having minute domains different from each other in pretilt angle.

As a modified embodiment, the above procedure was repeated, except that the wavelength of the UV light was less than 300 nm. As a result, the decomposition reaction of the long chain portion in the polyimide molecule occurred in addition to the above reaction of the polyimide. This gave rise to a further change in surface energy of the alignment film to form alignment domains which were more distinctly different from each other in pretilt angle.

EXAMPLE 3

A TFT substrate and a CF substrate were washed with running water and coated with a solution of a polyimide having a carbon-carbon double bond dissolved in NMP by means of a printing machine. The resultant coatings on the substrates were calcined by heating at 120° C. for one min and then baked at 180° C. for one hr. The alignment films thus obtained had a thickness of 500 Å. Then, the substrates were mounted on a proximity exposer and irradiated with UV light having wavelength of not less than 300 nm at 1000 mj/cm$^2$ through a photomask to selectively modify the alignment film. The substrates after the completion of UV irradiation was allowed to stand in air having a humidity of not less than 20% for 1 min. This gave rise to an intermolecular reaction of the long chain portion of the polyimide molecule, resulting in a change in molecular structure (see the reaction formula 2). As a result, the surface energy of the alignment film could be changed to provide alignment division type liquid crystal display panels having minute domains different from each other in pretilt angle.

As a modified embodiment, the above procedure was repeated, except that the wavelength of the UV light was less than 300 nm. As a result, the decomposition reaction of the long chain portion in the polyimide molecule occurred in addition to the above reaction of the polyimide. This gave rise to a further change in surface energy of the alignment film to form alignment domains which were more distinctly different from each other in pretilt angle.

EXAMPLE 4

A TFT substrate and a CF substrate were washed with running water and coated with a solution of a polyimide having two carbon-carbon double bonds dissolved in NMP by means of a printing machine. The resultant coatings on the substrates were calcined by heating at 120° C. for one min and then baked at 180° C. for one hr. The alignment films thus obtained had a thickness of 500 Å. Then, the substrates were mounted on a proximity exposer and irradiated with UV light having wavelength of not less than 300 nm at 1000 mJ/cm$^2$ through a photomask to selectively modify the alignment film. The substrates after the completion of UV irradiation was allowed to stand in air having a humidity of not less than 20% for 1 min. This gave rise to an intramolecular reaction of the long chain portion of the polyimide molecule, resulting in a change in molecular structure (see the reaction formula 3). As a result, the surface energy of the alignment film could be changed to provide alignment division type liquid crystal display panels having minute domains different from each other in pretilt angle.

As a modified embodiment, the above procedure was repeated, except that the wavelength of the UV light was less than 300 nm. As a result, the decomposition reaction of the long chain portion in the polyimide molecule occurred in addition to the above reaction of the polyimide. This gave rise to a further change in surface energy of the alignment film to form alignment domains which were more distinctly different from each other in pretilt angle.

EXAMPLE 5

A TFT substrate and a CF substrate were washed with running water and coated with a solution of a polyimide having a carbon-carbon double bond dissolved in NMP by means of a printing machine. The resultant coatings on the substrates were calcined by heating at 120° C. for one min and then baked at 180° C. for one hr. The alignment films thus obtained had a thickness of 500 Å. Then, the substrates were mounted on a proximity exposer and irradiated with UV light having wavelength of not less than 300 nm at 1000 mJ/cm$^2$ through a photomask to selectively modify the alignment film. The substrates after the completion of UV irradiation was allowed to stand in air having a humidity of not less than 20% for 1 min. This caused the long chain portion of the polyimide molecule to be reacted with water molecules in the air, resulting in a change in molecular structure (see the reaction formula 4). As a result, the surface energy of the alignment film could be changed to provide alignment division type liquid crystal display panels having minute domains different from each other in pretilt angle.

As a modified embodiment, the above procedure was repeated, except that the wavelength of the UV light used for selective exposure of the alignment film was less than 300 nm. As a result, the decomposition reaction of the long chain portion in the polyimide molecule occurred in addition to the above reaction of the polyimide. This gave rise to a further change in surface energy of the alignment film to form alignment domains which were more distinctly different from each other in pretilt angle.

EXAMPLE 6

A TFT substrate and a CF substrate were washed with running water and coated with a solution of a polyimide having a carbon-carbon double bond dissolved in NMP by means of a printing machine. The resultant coatings on the substrates were calcined by heating at 120° C. for one min and then baked at 180° C. for one hr. The alignment films thus obtained had a thickness of 500 Å. Then, the substrates were mounted on a proximity exposer and irradiated with UV light having wavelength of not less than 300 nm at 1000 mJ/cm$^2$ in a bromine gas atmosphere through a photomask to selectively modify the alignment film. This caused the long chain portion of the polyimide molecule to be reacted with bromine molecules, resulting in a change in molecular structure (see the reaction formula 5). As a result, the surface energy of the alignment film could be changed to provide alignment division type liquid crystal display panels having minute domains different from each other in pretilt angle.

As a modified embodiment, the above procedure was repeated, except that a chlorine, fluorine or iodine atmosphere was used instead of the bromine atmosphere. As a result, the results could be compared favorably with those in the embodiment where the bromine atmosphere was used.

As another modified embodiment, the above procedure was repeated, except that the wavelength of the UV light used for selective exposure of the alignment film was less than 300 nm. As a result, the decomposition reaction of the long chain portion in the polyimide molecule occurred in addition to the above reaction of the polyimide. This gave rise to a further change in surface energy of the alignment film to form alignment domains which were more distinctly different from each other in pretilt angle.

EXAMPLE 7

The procedures of Examples 1 to 6 were repeated, except that, instead of the polyimides, polyamic acids as precursors of the respective polyimides were used as the alignment film material. Specifically, solutions of polyamic acids dissolved in NMP were coated on a substrate, and the resultant coatings were dried and heat-cured to convert the polyamic acids to corresponding polyimides. Subsequently, alignment films were formed as described above and selectively exposed to UV light. As in the above examples, the molecular structure of the polyimide molecules was changed. As a result, the surface energy of the alignment films could be changed to provide alignment division type liquid crystal display panels having minute domains different from each other in pretilt angle.

As a modified embodiment, selective heating was carried out instead of UV irradiation as means for selectively modifying the alignment film. As a result, in all the cases, the results could be compared favorably with those in the embodiment where the UV irradiation was used. In this case, the selective heating was carried out under conditions of heating device: carbon dioxide gas laser, mask: not used (direct scanning on the substrate) and 1000 mJ/cm$^2$.

As is apparent from the foregoing detailed description, the present invention facilitates the selection of an alignment film necessary for the production of an alignment division type liquid crystal display panel. This eliminates the photographic process and wet process required of the conventional alignment division process, which contributes to marked process time shortening and reduction in cost. Further, since the damage to the alignment film can be reduced, the reliability of the liquid crystal display panel can be improved. Furthermore, when the polyimide used as the alignment film material is designed so that a particular functional group characteristic of the present invention is introduced therein, the alignment film necessary for the alignment division can be easily provided. Furthermore, the liquid crystal display panel provided by the present invention has a simple structure and excellent viewing angle characteristics and contrast.

We claim:

1. A liquid crystal display panel comprising a pair of substrates and a liquid crystalline substance sandwiched between said substrates, in which said substrates respectively at their inner walls are provided with an alignment film, at least one of said alignment films comprising a layer of a member selected from the group consisting of the following polyimide film materials:

1.) a polyimide which does not have in its molecule an ether bond but has at least one moiety selected from the group consisting of a peroxide, a ketone, an ester, an amine, an amide and derivatives of said moieties; and 2.) a polyimide which has in its molecule a carbon-carbon double bond or a carbon-carbon triple bond;

said alignment film comprising an assembly of two adjacent minute domains, said two minute domains being different from each other in pretilt angle which is defined as an angle at which liquid crystalline molecules rise from the surface of the substrate.

2. The liquid crystal display panel according to claim 1, wherein said polyimide can induce change in surface energy upon the action of energy.

3. The liquid crystal display panel according to claim 2, wherein said energy is light or heat energy.

4. The liquid crystal display panel according to claim 3, wherein said light energy is ultraviolet rays emitted from a mercury lamp.

5. The liquid crystal display panel according to claim 3, wherein said heat energy is heat from an infrared heater or a laser.

6. The liquid crystal display panel according to claim 1, wherein said alignment film comprises a layer of the polyimide which has in its molecule a carbon-carbon double bond or a carbon-carbon triple bond and can induce a change in surface energy upon the action of light or heat energy in the presence of a halogen.

7. A process for producing a liquid crystal display panel, said process comprising:

providing an alignment film material comprising a polyimide material selected from the group consisting of (1) a polyimide which does not have in its molecule an ether bond but has at least one moiety selected from the group consisting of a peroxide, a ketone, an ester, an amine, an amide and derivatives of said moieties and (2) a polyimide which has in its molecule a carbon-carbon double bond or a carbon-carbon triple bond;

applying a film of said material to a substrate;

selectively exposing adjacent minute areas of said film to respective different conditions of light or heat energy to thereby cause said adjacent minute domains to have respective different pretilt angles; and subsequently rubbing said film.

8. A process as set forth in claim 7, wherein at least one of said adjacent minute domains is subjected to a condition comprising irradiation by ultraviolet rays emitted from a mercury lamp.

9. A process as set forth in claim 8, wherein another one of said adjacent minute domains is subjected to a condition whereby it is not irradiated by said ultraviolet rays.

10. A process as set forth in claim 7, wherein at least one of said adjacent minute domains is subjected to a condition comprising irradiation by heat generated by an infrared heater or laser.

11. A process as set forth in claim 10, wherein another one of said adjacent minute domains is subjected to a condition whereby it is not irradiated by said infrared heat.

12. A process as set forth in claim 7, wherein said film is exposed to an atmosphere having a humidity of not less than 20% during or immediately after the application of said light or heat energy.

13. A process as set forth in claim 7, wherein said energy conditions are applied in a halogen atmosphere.

* * * * *